(12) United States Patent
Joyce et al.

(10) Patent No.: US 10,540,502 B1
(45) Date of Patent: Jan. 21, 2020

(54) SOFTWARE ASSURANCE FOR HETEROGENEOUS DISTRIBUTED COMPUTING SYSTEMS

(71) Applicant: Architecture Technology Corporation, Minneapolis, MN (US)

(72) Inventors: Robert A. Joyce, Ithaca, NY (US); Scott Aloisio, Ithaca, NY (US); Judson Powers, Ithaca, NY (US); Christopher Dominessy, Painted Post, NY (US)

(73) Assignee: ARCHITECTURE TECHNOLOGY CORPORATION, Minneapolis, MN (US)

( * ) Notice: Subject to any disclaimer, the term of this patent is extended or adjusted under 35 U.S.C. 154(b) by 318 days.

(21) Appl. No.: 15/622,434

(22) Filed: Jun. 14, 2017

(51) Int. Cl.
*G06F 21/57* (2013.01)
*G06F 16/22* (2019.01)

(52) U.S. Cl.
CPC ........ *G06F 21/577* (2013.01); *G06F 16/2246* (2019.01); *G06F 2221/034* (2013.01)

(58) Field of Classification Search
None
See application file for complete search history.

(56) References Cited

U.S. PATENT DOCUMENTS

| 7,496,959 | B2 | 2/2009 | Adelstein et al. |
| 7,818,804 | B2 | 10/2010 | Marceau |
| 8,458,805 | B2 | 6/2013 | Adelstein et al. |
| 8,499,354 | B1 | 7/2013 | Satish et al. |
| 8,862,803 | B2 | 10/2014 | Powers et al. |
| 9,081,911 | B2 | 7/2015 | Powers et al. |
| 9,083,741 | B2 | 7/2015 | Powers |
| 2012/0210427 | A1 | 8/2012 | Bronner et al. |
| 2014/0337971 | A1 | 11/2014 | Casassa Mont et al. |

(Continued)

FOREIGN PATENT DOCUMENTS

WO  WO 2017/105383 A1 * 6/2017 ............ H04L 29/06

OTHER PUBLICATIONS

Ana Paula Henriques de Gusmao et al, "Cybersecurity risk analysis model using fault tree analysis and fuzzy decision theory", 2018, International Journal of Information Management, p. 1-3.*

(Continued)

*Primary Examiner* — Christopher A Revak
(74) *Attorney, Agent, or Firm* — Shumaker & Sieffert, P.A.

(57) ABSTRACT

A risk model for a distributed computing system comprises a plurality of tree nodes organized as a tree. For each tree node of the risk model, the tree node corresponds to a respective event that may befall a distributed computing system. An analysis computing system generates data associating a test agent with a target and also generates data associating the test agent with a tree node in the risk model. The test agent performs a data gathering routine that gathers data from the target associated with the test agent. The gathered data may indicate whether the event corresponding to the tree node is occurring. Furthermore, the analysis computing system may perform the data gathering routine according to a recurrence pattern of the data gathering routine. The analysis computing system may output a graphical representation of the data indicating whether the event corresponding to the tree node is occurring.

19 Claims, 9 Drawing Sheets

(56) References Cited

U.S. PATENT DOCUMENTS

| | | | | |
|---|---|---|---|---|
| 2015/0339477 | A1* | 11/2015 | Abrams | G06F 21/554 726/23 |
| 2016/0099953 | A1* | 4/2016 | Hebert | H04L 63/1416 726/23 |
| 2016/0234242 | A1 | 8/2016 | Knapp et al. | |
| 2018/0048534 | A1* | 2/2018 | Banga | G06N 7/005 |
| 2018/0121657 | A1 | 5/2018 | Hay et al. | |
| 2018/0191770 | A1* | 7/2018 | Nachenberg | H04L 63/1425 |
| 2018/0367563 | A1* | 12/2018 | Pfleger de Aguiar | H04L 41/12 |
| 2019/0014153 | A1* | 1/2019 | Lang | G06F 21/57 |
| 2019/0102564 | A1* | 4/2019 | Li | G06F 21/577 |
| 2019/0164015 | A1* | 5/2019 | Jones, Jr. | G06K 9/6262 |
| 2019/0188615 | A1* | 6/2019 | Liu | G06Q 10/0635 |
| 2019/0258953 | A1* | 8/2019 | Lang | G06N 3/08 |

OTHER PUBLICATIONS

"Cybersecurity," US. Department of Defense Instruction, No. 8500. 01, Mar. 14, 2014, 59 pp, accessible via https://www.esd.whs.mil/Portals/54/Documents/DD/issuances/dodi/850001_2014.pdf.

"Cyberspace Operations," U.S. Air Force, Air Force Policy Directive 10-17, Jul. 31, 2012, 9 pp, accessible via https://fas.org/irp/doddir/usaf/afpd10-17.pdf.

Becker et al., "Applying Game Theory to Analyze Attacks and Defenses in Virtual Coordinate Systems," 41st International Conference on Dependable Systems & Networks (DSN), Jun. 2011, 12 pp.

Fisher, "Developing Software in a Multicore & Multiprocessor World," Klocwork.com., white paper, Sep. 2010, 9 pp.

Joyce et al., "MEGA: A Tool for Mac OS X Operating System and Application Forensics," Proceedings of the Digital Forensic Research Conference, Aug. 11-13, 2008, 9 pp.

Libicki, "Cyberdeterrence and Cyberwar," Rand Corporation, 2009, 238 pp.

Porche III et al., "A Cyberworm that Knows no Boundaries," RAND Corporation, 2011, 6 pp.

Quinlan et al., "ROSE User Manual: A Tool for Building Source-to-Source Translators," Draft User Manual, Version 0.9.6a, Lawrence Livermore National Laboratory, Dec. 16, 2015, 339 pp.

Shiva et al., "Game Theory for Cyber Security," Proceedings of the Sixth Annual Workshop on Cyber Security and Information Intelligence Research, Article No. 34, Apr. 2010, 5 pp.

Snyder et al., "Ensuring U.S. Air Force Operations During Cyber Attacks Against Combat Support Systems Guidance Where to Focus Mitigation Efforts," RAND Corporation, 2015, 36 pp.

U.S. Appl. No. 16/131,669, filed Sep. 14, 2018 by Christopher Dominessy et al.

Atighetchi et al., "Metrinome-Continuous Monitoring and Security Validation of Distributed Systems", Journal of Cyber Security and Information Systems vol. II, No. 1: Knowledge Management, Mar. 2014, 8 pgs.

Sironi et al., "Metronome" Operating System Level Performance Management via Self-Adaptive Computing, DAC 2012, Jun. 3-7, 2012, 10 pgs.

Vasiliadis et al., "GPU-asssisted malware", Int. J. Inf. Secur. (2015), Published Aug. 28, 2014, 9 pgs.

Balzarotti et al., "The impact of GPU-assisted malware on memory forensics: A case study", DFRWS 2015, 9 pgs. Applicant points out, in accordance with MPEP 609.04(a), that the year of publication, 2015, is sufficiently earlier than the effective U.S. filing date of the present application, so that the particular month of publication is not in issue.

Baloch et al., "Comparative Study of Risk Management in Centralized and Distributed Software Development Environment", Sci. Int.(Lahore),26(4),1523-1528, 2014, 6 pgs. Applicant points out, in accordance with MPEP 609.04(a), that the year of publication, 2014, is sufficiently earlier than the effective U.S. filing date of the present application, so that the particular month of publication is not in issue.

PR Newswire, "ATCorp Releases CSAS—Cloud Security Analysis Suite for Applications in the Cloud" Feb. 26, 2016, 2 pgs.

Wikipedia-OpenCL, Mar. 29, 2017, Retrieved from https://en.wikipedia.org/wiki/OpenCL, 15 pgs.

ROSE: Main Page, Mar. 29, 2017, Retrieved from http://rosecompiler.org/ROSE_HTML_Reference/, 3 pgs.

Schneier, "Attack Trees—Schneier on Security", Dr. Dobb's Journal, Dec. 1999, Retrieved from https://www.schneier.com/academic/archives/1999/12/attack_trees.html, 9 pgs.

Richard, "Memory Analysis, meet GPU Malware", Oct. 22, 2014, CERIAS, Retrieved from http://www.cerias.purdue.edu/news_and_events/events/security_seminar/details/index/popenihmencsf2v5mggg5ulfd4, 2 pgs.

2015 DFRWS Forensics Challenge—Submitted Solutions and Source Code Released, Retrieved from http://www.cs.uno.edu/~golden/gpu-malware-research.html, 5 pgs. Applicant points out, in accordance with MPEP 609.04(a), that the year of publication, 2015, is sufficiently earlier than the effective U.S. filing date of the present application, so that the particular month of publication is not in issue.

U.S. Appl. No. 15/485,784, filed Apr. 12, 2017 by Robert A. Joyce et al.

* cited by examiner

SOFTWARE ASSURANCE FOR HETEROGENEOUS DISTRIBUTED COMPUTING SYSTEMS

STATEMENT REGARDING FEDERALLY SPONSORED RESEARCH OR DEVELOPMENT

This invention was made with government support under Contract No. HQ0147-17-C-7204 awarded by the Missile Defense Agency, US Department of Defense. The government has certain rights in this invention.

BACKGROUND

A heterogeneous distributed computing system, such as a large modeling and simulation (M&S) system, may include multiple types of devices. For example, an M&S system may comprise network-enabled sensors, server computing devices, end-user devices, firewall devices, intrusion detection systems, and so on. Furthermore, due to accelerating computing demands of M&S systems, there is growing interest in using specialized hardware solutions in M&S tasks. Field programmable gate arrays (FPGAs), graphical processing units (GPUs), distributed computing, real-time processing, and hardware-in-the-loop tasks have resulted in faster and more accurate simulations. The devices of a heterogeneous distributed computing system may be distributed geographically.

The potentially large numbers and diverse types of devices in a heterogeneous distributed computing system may be necessary to allowing the heterogeneous distributed computing system perform a desired role. However, the numbers and types of devices in a heterogeneous distributed computing system may increase the difficulty administrators face in preventing, diagnosing, and correcting faults, errors, misconfigurations, security breaches, downtime, and other adverse events that may befall the heterogeneous distributed computing system. For instance, a wide heterogeneous array of hardware components with varying degrees of connectivity may prevent use of many conventional approaches to health and status monitoring of M&S systems.

Managing and monitoring M&S systems may be further complicated by the security requirements of M&S systems. In some instances, data integrity must be maintained for status information in transit and in storage. Furthermore, in some instances, security credentials for gathering status information remotely must be secure and private. Additionally, in some instances, connecting and querying a collection of M&S nodes may be difficult without many layers of abstraction and treating individual nodes as isolated entities may increase management overhead. In some instances, security policies may even restrict certain avenues for status information collection, prohibiting remote shell access or supporting components that are outside of administrative control.

SUMMARY

This disclosure describes techniques for monitoring for and preventing adverse events in a distributed computing system, such as a modeling and simulation (M&S) system. For instance, techniques of this disclosure may model, analyze, and automatically evaluate security configurations of large-scale, heterogeneous distributed systems, including M&S systems. As described herein, risk models are used to model adverse events. For each respective tree node of a risk model, the respective tree node corresponds to a respective event that may befall the distributed computing system. For each respective non-leaf tree node of the risk model, the events corresponding to child tree nodes of the respective non-leaf tree node are preconditions of the event corresponding to the respective non-leaf tree node. Furthermore, test agents are associated with various tree nodes of the risk model. A test agent associated with a tree node may perform, according to a predefined recurrence pattern, a data gathering routine that gathers data from a target. The target may comprise one or more target nodes, such as devices, in the distributed computing system. In some instances, the data gathered by the data gathering routine may indicate whether the event corresponding to the tree node in the risk model is occurring, has occurred, or will occur. In some instances, the data gathered by the data gathering routine may indicate whether the event corresponding to the tree node can occur. In this way, the techniques of this disclosure may generate a record of fallibility based on a risk model with associated automated tests. Furthermore, an analysis computing system may output a graphical representation of the data for display.

An analyst using a computing system implementing techniques of this disclosure may be able to use the techniques to build a risk model, configure the risk model to run automated tests on a collection of target system nodes of a distributed computing system, and monitor results of those tests over time. Furthermore, the techniques of this disclosure may manage cybersecurity risk using close and continuous monitoring to match current trends.

An analysis computing system implementing the techniques of this disclosure may give security analysts and system maintainers abilities to discover actual technical vulnerabilities in their systems, evaluate the risks those vulnerabilities pose in their specific configurations (e.g., M&S configurations), mitigate those risks, and compare alternatives. The analysis computing system may also support monitoring for continuing compliance, should the distributed computing system change or new attack vectors be uncovered. Additionally, the analysis computing system may have the ability to compute security-relevant metrics for the system as a whole, including remediation costs and impacts of particular attacks. In doing so, the analysis computing system may save time while providing more thorough and repeatable analysis, especially of the complex interconnections in typical large-scale distributed computing systems.

In one example, this disclosure describes a method comprising: generating, by an analysis computing system comprising processing circuitry, data representing a risk model for a distributed computing system, wherein: the risk model comprises a plurality of tree nodes organized as a tree, for each respective tree node of the risk model, the respective tree node corresponds to a respective event that may befall the distributed computing system, for each respective non-leaf tree node of the risk model, the events corresponding to child tree nodes of the respective non-leaf tree node are preconditions of the event corresponding to the respective non-leaf tree node, and the tree nodes of the risk model include an inspected tree node; generating, by the processing circuitry of the analysis computing system, data associating a test agent with a target, the test agent configured to perform a data gathering routine that gathers data from the target associated with the test agent, the target associated with the test agent comprising one or more system nodes in the distributed computing system; generating, by the processing circuitry, data associating the inspected tree node of the risk model with the test agent, the data gathered by the data gathering routine of the test agent indicating whether the event corresponding to the inspected tree node is occurring or has occurred; performing, by the processing circuitry, according to a predefined schedule that specifies a recurrence pattern of the data gathering routine of the test agent, the data gathering routine of the test agent; and outputting, by the processing circuitry, a graphical representation of the data indicating whether the event corresponding to the inspected tree node is occurring or has occurred.

In another example, this disclosure describes a system comprising: a data storage system; and processing circuitry configured to: generate, in the data storage system, data representing a risk model for a distributed computing system, wherein: the risk model comprises a plurality of tree nodes organized as a tree, for each respective tree node of the risk model, the respective tree node corresponds to a respective event that may befall the distributed computing system, for each respective non-leaf tree node of the risk model, the events corresponding to child tree nodes of the respective non-leaf tree node are preconditions of the event corresponding to the respective non-leaf tree node, the tree nodes of the risk model include an inspected tree node, generate, in the data storage system, data associating a test agent with a target, the test agent configured to perform a data gathering routine that gathers data from the target associated with the test agent, the target associated with the test agent comprising one or more system nodes in the distributed computing system; generate, in the data storage system. data associating the inspected tree node of the risk model with the test agent, the data gathered by the data gathering routine of the test agent indicating whether the event corresponding to the inspected tree node is occurring or has occurred; perform, according to a predefined schedule that specifies a recurrence pattern of the data gathering routine of the test agent, the data gathering routine of the test agent; and output a graphical representation of the data indicating whether the event corresponding to the inspected tree node is occurring or has occurred.

In one example, this disclosure describes a non-transitory computer-readable storage medium having instructions stored thereon that, when executed, configure processing circuitry an analysis computing system comprising to: generate data representing a risk model for a distributed computing system, wherein: the risk model comprises a plurality of tree nodes organized as a tree, for each respective tree node of the risk model, the respective tree node corresponds to a respective event that may befall the distributed computing system, for each respective non-leaf tree node of the risk model, the events corresponding to child tree nodes of the respective non-leaf tree node are preconditions of the event corresponding to the respective non-leaf tree node, the tree nodes of the risk model include an inspected tree node, generate data associating a test agent with a target, the test agent configured to perform a data gathering routine that gathers data from the target associated with the test agent, the target associated with the test agent comprising one or more system nodes in the distributed computing system; generate data associating the inspected tree node of the risk model with the test agent, the data gathered by the data gathering routine of the test agent indicating whether the event corresponding to the inspected tree node is occurring or has occurred; perform, according to a predefined schedule that specifies a recurrence pattern of the data gathering routine of the test agent, the data gathering routine of the test agent; and output a graphical representation of the data indicating whether the event corresponding to the inspected tree node is occurring or has occurred.

The details of one or more examples are set forth in the accompanying drawings and the description below. Other features, objects, and advantages of the disclosure will be apparent from the description and drawings, and from the claims.

DETAILED DESCRIPTION

Figure 1:
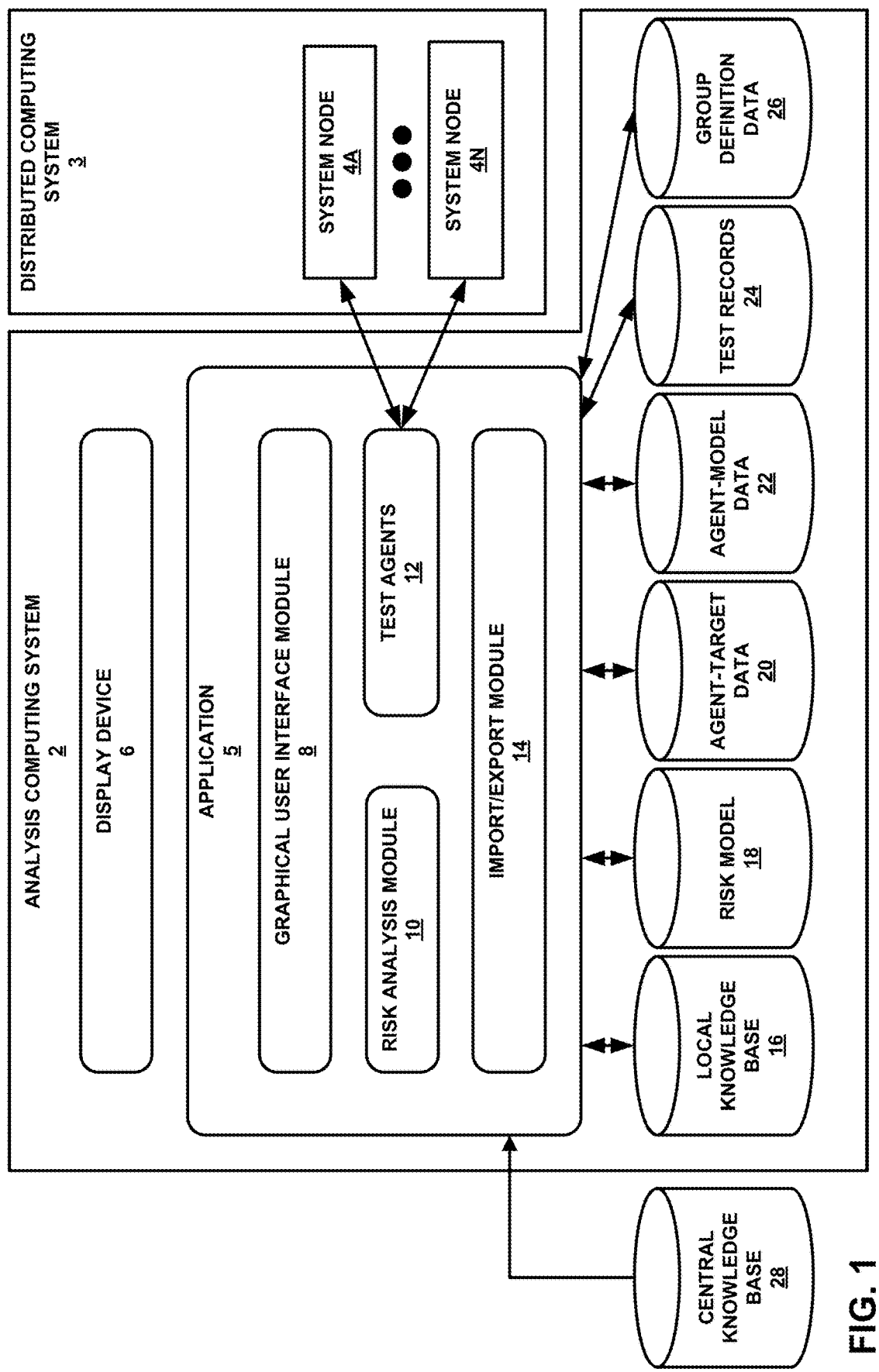
FIG. 1 is a block diagram illustrating an example analysis computing system and an example distributed computing system, in accordance with one or more aspects of the present disclosure.

Distributed computing systems, such as modeling and simulation (M&S) systems, may include many different types of devices distributed across multiple locations. Furthermore, many different types of events may befall a distributed computing system. Accordingly, tools may be needed for assessing, on an ongoing basis, whether events are occurring, have occurred, will occur, or can occur in a distributed computing system. For example, an M&S system may be used for weather forecasting. In this example, failure to receive all needed data from an array of measuring stations prior to running a weather forecasting model may be an example of an event. Failure to complete a run of a weather forecasting model may be another example of an event in the M&S system of this example. Events may befall an M&S system for a variety of reasons. For example, failure to receive all needed data from an array of measuring stations may occur because there was insufficient bandwidth in a communication network to transfer data from the measuring stations to computing devices that use the data to run the weather forecasting model. In another example, a failure to complete a run of a weather forecasting model may be caused by a temperature of one or more computing devices performing the computations of the weather forecasting model rising above an overheating threshold, causing shutdown of the one or more computing devices.

It is noted in this disclosure that the reasons for an adverse event occurring in a system such as an M&S system may be characterized using a risk model. This risk model may take the form of a tree of nodes (i.e., tree nodes). A root tree node of the tree corresponds to a top-level event. Each non-root tree node of the tree corresponds to a precondition of the event corresponding to the non-root tree node's parent tree node. In a context where an event is a cyberattack, child tree nodes of an attack goal of the cyberattack may correspond to sub-goals of the cyberattack. For example, an event of an attacker modifying stored data may correspond to a root tree node of the tree and sub-goals may be modifying the data during computation or modifying the data in storage. In the example of the previous paragraph, the event of failure to complete a run of a weather forecasting model may correspond to a root tree node of the tree and overheating may correspond to a child tree node of the root tree node. As described herein, an analysis computing system may use test agents to determine whether events associated with tree nodes are occurring, have occurred, will occur, or can occur.

Accordingly, in one example of this disclosure, an analysis computing system may generate data representing a risk model for a distributed computing system, such as a modeling and simulation (M&S) system. The risk model comprises a plurality of tree nodes organized as a tree. For each respective tree node of the risk model, the respective tree node corresponds to a respective event that may befall the distributed computing system. For each respective non-leaf tree node of the risk model, the events corresponding to child tree nodes of the respective non-leaf tree node are preconditions of the event corresponding to the respective non-leaf tree node. The tree nodes of the risk model include an inspected tree node. In some examples, the event corresponding to the inspected tree node may correspond to a cyberattack on an individual system node or group of system nodes in the distributed computing system. Furthermore, in this example, the analysis computing system may generate data associating a test agent with a target. The test agent is configured to perform a data gathering routine that gathers data from the target associated with the test agent. The target associated with the test agent comprises one or more target tree nodes or target groups in the distributed computing system.

The analysis computing system may also generate data associating the inspected tree node of the risk model with the test agent. In some examples, not all tree nodes are associated with test agents. The data gathered by the data gathering routine of the test agent may indicate whether the event corresponding to the inspected tree node is occurring. Furthermore, in this example, the analysis computing system may perform, according to a predefined schedule that specifies a recurrence pattern of the data gathering routine of the test agent, the data gathering routine of the test agent. In this example, the analysis computing system, may output a representation of the data indicating whether the event corresponding to the inspected tree node is occurring. In this way, the analysis computing system may address a specific problem arising in the art of distributed computing systems.

FIG. 1 is a block diagram illustrating an example analysis computing system 2 and an example distributed computing system 3, in accordance with one or more aspects of the present disclosure. In some examples, distributed computing system 3 comprises an M&S system. As shown in FIG. 1, analysis computing system 2 is communicatively coupled to one or more system nodes 4A-4N (collectively, "system nodes 4"). For instance, analysis computing system 2 may be communicatively coupled to system nodes 4 via a communication network, such as the Internet. Analysis computing system 2 is configured to execute an application 5 in order to analyze operation of distributed computing system 3. Furthermore, in the example of FIG. 1, analysis computing system 2 includes a display device 6 that displays data.

System nodes 4 may comprise constituent devices of distributed computing system 3. For example, system node 4A may comprise a sensor device of a weather forecasting system, system node 4B may comprise a compute node of the weather forecasting system, and so on. In some examples, one or more system nodes 4 may comprise server blades, graphical processing units (GPUs), server computers, personal computers, mobile computing devices, supercomputers, Internet-of-Things (IOT) devices, and other types of communication-equipped devices. In some examples, one or more system nodes 4 may be implemented as one or more virtual machines. Analysis computing system 2 may comprise one or more computing devices. For example, computing system 2 may comprise one or more personal computers, server computers, server blades, mobile computing devices, or other types of computing devices.

In the example of FIG. 1, application 5 includes a graphical user interface (GUI) module 8, a risk analysis module 10, one or more test agents 12, and an import/export module 14. Analysis computing system 2 includes a local knowledge base 16, a risk model 18, agent-target data 20, agent-model data 22, test records 24, and group definition data 26. Each of local knowledge base 16, risk model 18, agent-target data 20, agent-model data 22, test records 24, and group definition data 26 may be stored in a data storage system. The data storage system may comprise one or more storage media, such as hard disks, optical disks, persistent memory units, and so on. In the example of FIG. 1, analysis computing system 2 is also communicatively coupled to a central knowledge base 28, which may, in some cases, be remote from and external to analysis computing system 2.

Using analysis computing system 2, an analyst can use multiple kinds of evaluations provided by risk analysis module 10 to generate an overall risk assessment for one or more of system nodes 4, which may comprise one or more remote or cloud systems, such as an M&S system. The security models used and/or provided by risk analysis module 10 may, in some cases, incorporate design- and run-time evaluation from multiple sources, such as test agents 12.

As shown in FIG. 1, application 5 may receive data from local knowledge base 16 and central knowledge base 28 using import/export module 14. Local knowledge base 16 may be local to, and stored on, analysis computing system 2. Central knowledge base 28 may include data associated with common vulnerabilities to computing systems and/or known attacks that may be initiated against such systems. Much of the data included in central knowledge base 28 may include vendor- or community provided data that is updated over time as more information becomes available.

In some instances, the data stored in central knowledge base 28 may also be stored or copied into local knowledge base 16 of analysis computing system 2 via import/export module 14. Local knowledge base 16 may also include policy information associated with rules as to which operations may or may not be performed by a given system, such as one or more of computing systems 20. Import/export module 14 may import the information contained in local knowledge base 16 and/or central knowledge base 28, and may provide such information to risk analysis module 10 for use in risk modeling and analysis operations.

Risk analysis module 10 utilizes the information provided by test agents 12 based on the monitoring of runtime computing systems 20. Using the information provided by import/export module 14 and test agents 12, risk analysis module 10 is capable of performing risk modeling and analysis operations to determine whether events are occurring, have occurred, potentially may occur, identify any potential vulnerabilities, risks, or malicious code (e.g., malware) associated with execution of processes in runtime computing systems 20, and so on. Risk analysis module 10 may utilize graphical user interface module 8 to provide graphical representations, such as graphical representations of vulnerabilities and risks, within a graphical user interface that is output to a user (e.g., analyst). Based on the output provided by GUI module 8, a user may determine what corrective or preventive actions to take. In some examples, such actions make take place in a software development process (e.g., modifying code or configuration information to mitigate or eliminate such vulnerabilities or risks), by updating software, making configuration changes, removing system nodes from distributed computing system 3, and so on.

In the example of FIG. 1, GUI module 8 outputs GUIs for display on display device 6. Although shown as part of analysis computing system 2, display device 6 may be part of a separate computing system, such as a client computing system. In some examples, GUI module 8 outputs a risk model design interface for display. The risk model design interface may enable the user to design a risk model, such as risk model 18, for distributed computing system 3. Based on indications of user input received via the risk model design interface, risk analysis module 10 may generate data representing the risk model. In some examples, the data representing the risk model is stored as XML data. Risk analysis module 10 may configure GUI module 8 to use the data representing risk model 18 to output a GUI based on risk model 18.

In accordance with techniques of this disclosure, risk model 18 comprises a plurality of tree nodes organized as a tree. Each tree node of the tree may correspond to an event that may occur in distributed computing system 3. For each respective non-leaf tree node of risk model 18, the events corresponding to child tree nodes of the respective non-leaf tree node are preconditions of the event corresponding to the respective non-leaf tree node. For example, a particular tree node of risk model 18 may correspond to a failure of a system node in distributed computing system 3 not sending data. In this example, a first child tree node of the particular tree node may correspond to the system node not being powered on; a second child tree node of the particular tree node may correspond to a network interface controller (NIC) of the system node not being properly configured; a third child tree node of the particular tree node may correspond to there being insufficient bandwidth to send data from the system node, and so on.

The events corresponding to child tree nodes of a given tree node in risk model 18 may be conjunctive or disjunctive for the occurrence of the event corresponding to the given tree node. In instances where events corresponding to child tree nodes of the given tree node are conjunctive, all events corresponding to the child tree nodes must be met in order for the event corresponding to the given tree node. For example, an event corresponding to a first child tree node of the given tree node and an event corresponding to a second child tree node of the given tree node may both need to occur for the event corresponding to the given tree node to occur. In instances where events corresponding to child tree nodes of the given tree node are disjunctive, one or more of the events corresponding to the child tree nodes must be met. For example, either an event corresponding to a first child tree node of the given tree node or an event corresponding to a second child tree node of the given tree node may be sufficient for occurrence of the event corresponding to the given tree node.

In some examples, leaf tree nodes may correspond to events that may occur because of a vulnerability in distributed computing system 3. For example, an attacker might break an encryption code protecting passwords. In this example, an attacker breaking an encryption code protecting passwords may be an event corresponding to a leaf tree node of a risk model. Therefore, the risk model may illustrate how vulnerabilities can lead to possible root-level events, such as how an attacker may exploit a vulnerability to achieve the attacker's possible aims.

In some examples, application 5 may receive data representing all or portions of risk model 18 from import/export module 14 or another source. Import/export module 14 may receive such data from another computing device or computer-readable storage media. Moreover, import/export module 14 may export data representing risk model 18. In some examples, import/export module 14 may export or import data representing risk model 18 using a version control system, such as CVS or SVN. Furthermore, in some examples, GUI module 8 may output, for display, a risk model comparison interface for comparing changes in versions of risk models. For example, the risk model comparison interface may show a vertically split window with a risk model hierarchy on either side. In this example, along a window border between a left and right segment, lines may connect differences in attack trees. Furthermore, in some examples, an unmodified tree has one top level node with the name "ROOT." In this example, the tree is modified to include two additional nodes nested below the ROOT node. The user may be able to look at a split window with the unmodified ROOT tree on the left, and the augmented tree on the right. In this case, the left tree shows a line under ROOT extending to the right tree where the added child nodes are highlighted. This indicates that the left tree is missing child nodes that are present in the updated tree. This type of interface is analogous to a side-by side text "diff", of which there are many existing examples.

Similar to text-based version control systems, the risk model comparison interface may show differences between local and shared versions of the same risk model. For example, version control systems allow many different users to make changes to a project without conflicting with each other. For instance, a group of students has a group project where they must program a game together. Instead of working on separate components and sharing them between each other's computers, the students all contribute to the project on one master computer. When one of the students wants to make a change, the student starts by copying the most recent version from the master computer. The student can then make their change and easily copy their version back to the master. The master computer has the "shared" file. In the same way, users of application 5 can collaborate on a risk model by copying from a master computer (a version control system), making changes, and copying it back. The risk model comparison interface may enable users of application 5 to quickly identify differences between files so that the users can recognize when another user has made conflicting changes while the user was working on the user's "local" copied file. In some examples, this approach may have the added benefit of being able to roll-back to previous system configurations.

Furthermore, in some examples, to automate and simplify the process of generating risk model 18, standardized guidelines can be used to outline avenues for events, such as cyberattacks. For instance, application 5 may use established guidance metrics such as NIST Special Publication 800-53 and Common Weakness Enumeration (CWE). Import/export module 14 may import these guidelines into a risk model as attack goals, which risk analysis module 10 may then test for compliance. In accordance with a technique of this disclosure, application 5 may support security guidelines for enterprise Linux, such as the Red Hat OVAL patch definitions. Additionally, in some examples, application 5 may read architectural documents in the Graphviz dot format. In some examples, the set of supported formats and architectural primitives may be expanded to focus on M&S needs.

In some examples, application 5 may automatically generate parts of risk model 18. For instance, in one example, application 5 may receive data indicating system nodes in distributed computing system 3. Similar events may occur to a plurality of the system nodes. Hence, application 5 may automatically generate a respective sub-tree of tree nodes for each respective system node of the plurality of system nodes. Each of the generated sub-trees may comprise a respective set of identical tree nodes. Automatically generating sub-trees may be especially valuable in the context of M&S systems because M&S systems may include large numbers of system nodes.

For example, a parent tree node of risk model 18 may correspond to an event of sensitive data being intercepted by an attacker. In this example, the sensitive data may be intercepted using a man-in-the-middle attack. Furthermore, in this example, a man-in-the-middle-attack may occur if either or both a first system node that sends the sensitive data or a second system node that receives the sensitive data is compromised. In this example, there may be a predefined sub-tree for a system node being compromised. Hence, in this example, risk model 18 may include a tree node corresponding to the event of the sensitive data being intercepted. Additionally, application 5 may automatically add a first instance and a second instance of the predefined sub-tree to risk model 18. The first instance corresponds to the first system node being compromised and the second instance corresponds to the second system node being compromised. Root tree nodes of the two instances of the predefined sub-tree are child tree nodes of the tree node corresponding to the event of the sensitive data being compromised.

In one example, analysis computing system 2 may receive data identifying system nodes in distributed computing system 3 that perform the same roles in distributed computing system 3. For instance, each of the identified system nodes may perform the role of a compute node that performs part of a calculation. In another instance, each of the identified system nodes may perform the role of a temperature sensor. In some instances, analysis computing system 2 may receive the data identifying the system nodes from a management system of distributed computing system 3 (e.g., in the form of XML data). In this example, for each respective system node of the identified system nodes, analysis computing system 2 may automatically generate, in risk model 18, a respective sub-tree for the respective system node based on a predefined template sub-tree. In this way, analysis computing system 2 may save a user time in replicating parts of a risk model for each system node. A user may define the predefined template sub-tree, or the predefined template sub-tree may be imported in a similar manner to the importation of risk models described elsewhere in this disclosure.

Test agents 12 may comprise software modules configured to gather data from targets in distributed computing system 3. In other words, each of test agents 12 may perform one or more data gathering routines on targets. In some examples, test agents 12 may be modular and may be plugged-in and removed from a framework provided by application 5.

This disclosure may refer to gathering data from a target as "querying" the target. In this disclosure, a "target" may refer to a system node or a target group. This disclosure may refer to a group of system nodes as a "target group." A "target system node" for a test agent is a system node from which the test agent gathers data. As described elsewhere in this disclosure, system nodes are discrete components of distributed computing system 3. For example, a target system node may comprise a physical device, such as one of system nodes 4 or a virtual machine hosted by one of system nodes 4. In some examples, software applications, such as device management software, run on one or more of system nodes 4. In this example, the device management software may run on one of system nodes 4 and may manage one or more other system nodes of distributed computing system 4. In an M&S system, system nodes may be discrete components of the M&S system that are suitable for running simulations or managing other components.

Test agents 12 may be implemented in various ways. In some examples, a test agent of application 5 communicates with a corresponding software module running on a system node. The corresponding software module running on the system node may exist for the purpose of providing data to a test agent. In other examples, the corresponding software module may be more general purpose, such as a web server, command shell host, or other type of software module. In some examples, a corresponding software module on a system node may simply be part of software for performing a task of a system node.

A test agent may receive data from a system node in various ways. In other words, a test agent may perform a data gathering routine in various ways. In some examples, a test agent may request data from a system node. In some examples, a test agent receives push data from a system node. In some examples, a system node publishes data to a data store from which a test agent reads the data. In some examples, a test agent may gather data from a system node by invoking one or more methods of an application programming interface (API) implemented by the system node. For example, one or more system nodes of distributed computing system 3 may be hosted by a cloud services provider. In this example, a test agent may gather data from a system node by invoking one or more methods of a cloud service provider API (e.g., an Amazon Web Services (AWS) and OpenStack API). To ensure integrity of collected data in transit, communication between a test agent and a target system node may occur through the Secure Sockets Layer (SSL) protocol. In some examples where one or more system nodes of distributed computing system 3 are hosted by a cloud service provider, test agents 12 may use security policies that are consistent with the cloud service provider to ensure that data is being transmitted safely to and from system nodes when queried. In some examples, test agents 12 are adaptable to query new or additional APIs through use of Eclipse extension points.

To support the potentially large, federated structure of M&S systems, the notion of a target group is introduced. A target group is a set of system nodes (e.g., computing devices, VMs, etc.) in distributed computing system 3. The use of target groups may be helpful when configuring large numbers of system nodes for automated testing is prohibitively tedious. Limitations on low-level components in an M&S system sometimes prevent direct automated testing.

In some examples, a test agent may need to one or more parameters when communicating with a system node. For instance, one or more system nodes of distributed computing system 3 may require test agents 12 provide valid authentication credentials as a condition of sending particular types (e.g., data indicating measurements generated by the system node, data indicating a firmware version of the system node, etc.) of data to test agents 12. For example, a system node may request a test agent provide a valid username and password. In this example, the system node does not send particular types of data to the test agent unless the username and password provided by the test agent are valid. Other types of parameters may include network addresses, port numbers, and indications of communication protocols to use for communicating with target system nodes, user access credentials, API endpoints, and so on. In some examples, import/export module 14 may import such parameters from one or more files. Furthermore, in some examples, GUI module 8 may output, for display, one or more user interfaces for editing such parameters.

Figure 6:
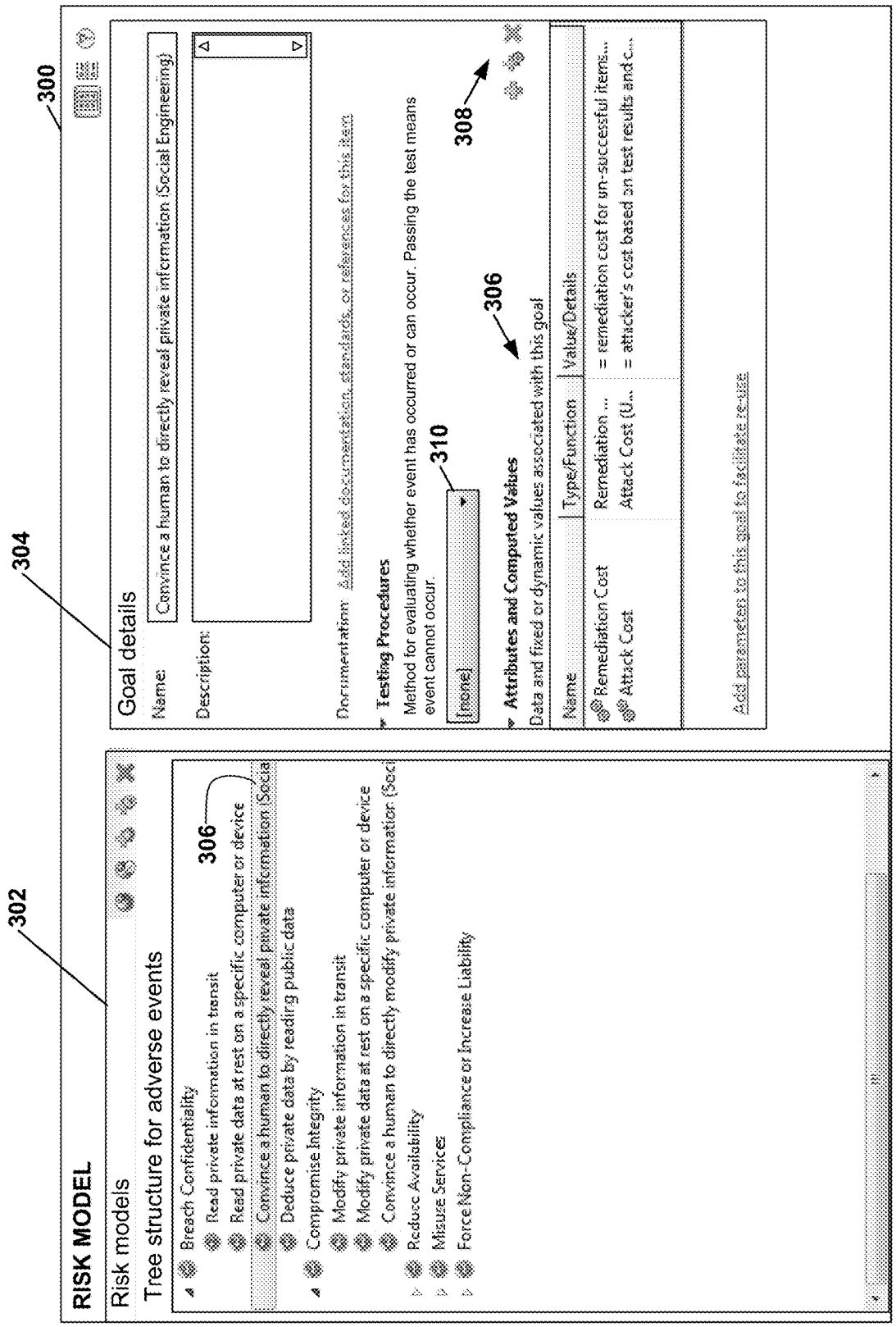
FIG. 6 is a screen diagram illustrating an example user interface for associating tree nodes of a risk model with test agents, in accordance with one or more aspects of the present disclosure.

In some examples, GUI module 8 may output a group definition interface for display. GUI module 8 may receive, via the group definition interface, indications of user input to define target groups. In other words, the group definition interface may enable a user of application 5 to define target groups. In some examples, GUI module 8 may generate group definition data 26 based on the indications of user input defining target groups. FIG. 6, described elsewhere in this disclosure, shows an example group definition interface.

In some examples, a test agent may gather data from a management system. A management system may be hosted by one or more system nodes in distributed computing system 3 and may manage other system nodes in distributed computing system 3. For example, distributed computing system 4 may comprise a task distribution unit (acting here as a management system) and a dedicated cluster of computers that perform computing tasks assigned by the task distribution unit. In this example, a test agent may gather data regarding the cluster of computers from the task distribution unit. In some examples, distributed computing system 3 comprises a plurality of embedded systems. In this example, because embedded systems frequently have dedicated and fixed functions, it may be difficult for test agents 12 to query the embedded systems directly for status information. However, in this example, the embedded systems may be configured to communicate with a management system. For instance, the embedded systems may include a plurality of temperature sensors that communicate temperature readings to the management system. In this example, a test agent may query the management system to gather information about the embedded systems. Similar examples may be provided for other low-level components. If no management system is available to query, test agents 12 may allow for manual test goals to be updated based on non-automated test procedures. In the case where some component of a M&S system is not connected to a network, non-automated results can be input by a user of application 5. A window, for example, is a security concern if it is broken. Instead of querying the window for broken status via some sophisticated sensor, application 5 may allow users to take a non-automated approach by just walking around the building and taking note of any broken windows. In this example, the users may provide input to application 5 indicating that the "test procedure" has passed if no broken windows are found.

In some examples, import/export module 14 may import target group definition data from one or more management systems of distributed computing system 3. For example, instead of GUI module 8 receiving indications of user input to assign target system nodes as being members of target groups, import/export module 14 may receive data from a management system of distributed computing system 3 indicating target system nodes managed by the management system. In this example, import/export module 14 may generate group definition data 26 indicating that the target system nodes managed by the management system are members of a target group.

In some examples, GUI module 8 may output, for display on display device 6, an agent-target interface. GUI module 8 may receive, via the agent-target interface, indications of user input to associate test agents with targets (e.g., target system nodes or target groups) in distributed computing system 3. In other words, a user may use the agent-target interface to associate test agents 12 with system nodes or target groups. Based on the indications of user input, GUI module 8 may generate data associating a test agent with a target (i.e., group definition data 26). Group definition data 26 may be in the form of XML data, relational database data, or data structured in another manner.

Risk analysis module 10 may use group definition data 26 to instruct particular test agents 12 to gather data from particular targets. For example, group definition data 26 may indicate that a test agent A of application 5 is associated with a target B in distributed computing system 3. Hence, in this example, risk analysis module 10 may instruct test agent A to gather data from target B.

In some examples, application 5 interoperates with established guidance such as NIST Special Publication 800-53 and the Federal Risk and Authorization Management Program (FedRAMP). Application 5 may perform automated evaluations and computations on risk models, testing on-line to see whether particular vulnerabilities are present or known-weak configurations or libraries are in use, then computing metrics and costs based on component metrics. For example, tree goals may be augmented with additional attributes such as severity, impact, or remediation cost. These attributes can be static, or can be computed in terms of sub-goals. For example, a possible attack on a secure facility involves breaking windows to gain physical access. In this example, remediation cost could be added as an attribute to the window breaking tree goal to represent the cost of installing metal bars over the windows. In a monitoring sense, it is possible to attribute costs to the failure of an event. Application 5 may be configured to import tree nodes from the National Vulnerability Database (i.e., the NIST National Vulnerability Database). These vulnerabilities have a standardized severity score between 1 and 10. Application 5 may highlight nodes based on the severity of the score.

Automated evaluations performed by test agents 12 may make use of NIST Security Content Automation Protocol (SCAP) standards, such as the Open Vulnerability and Assessment Language (OVAL), Common Weakness Enumeration (CWE), and the Common Vulnerabilities and Exposures (CVE) database. In addition to SCAP-based testing, test agents 12 may also execute commands directly on target system nodes of distributed computing system 3 using Secure Shell (SSH) and may use management APIs for cloud infrastructures, such as OpenStack and Amazon Web Services. Test results and up-to-date CVE results are returned as test records 24, which may store status information in a tree structure that mirrors the tree of risk model 18. As describe elsewhere in this disclosure, risk analysis module 10 may analyze test records and summarize the test records in a dashboard format that lets a user pinpoint critical risks and the most cost-effective means to address the risks.

In some examples, GUI module 8 may output, for display on display device 6, an agent-model interface. GUI module 8 may receive, via the agent-model interface, indications of user input to associate test agents with tree nodes of risk model 18. In other words, a user may use agent-model interface to associate test agents 12 with tree nodes of risk model 18. Based on the indications of user input, GUI module 8 may generate data associating a test agent with a tree node of risk model 18 (i.e., agent-model data 22).

As discussed elsewhere in this disclosure, application 5 may automatically generate sub-trees within risk model 18. For instance, application 5 may re-use the same predefined sub-tree for events that may happen at the level of a system node. In some such examples, application 5 may automatically associate system nodes with tree nodes of risk model 18.

In accordance with one or more techniques of this disclosure, a test agent may be configured to perform, according to a predefined schedule that specifies a recurrence pattern of the data gathering routine of the test agent, the data gathering routine of the test agent. For example, a test agent may perform a data gathering routine once per second, minute, hour, day, every other Tuesday, first day of the month, etc. Performing the data gathering routine of a test agent according to such a predefined schedule may allow application 5 to gather data needed for ongoing monitoring of distributed computing system 3 for adverse events. Moreover, performing the data gathering routine of a test agent may allow application 5 to generate data showing ongoing trends.

Different test agents 12 may perform data gathering routines according to different recurrence patterns. For example, it may be sufficient for a first test agent to gather data about a temperature of a processor performing calculations in distributed computing system 3 once every five minutes, while a second test agent may only determine whether a most recent security patch has been installed on a piece of software on a target system node once per week. Running data gathering routines of different test agents according to different recurrence patterns may result in more efficient use of processing and bandwidth resources than a system in which data gathering routines of all agents 12 are run as a single batch.

The recurrence patterns of test agents 12 may be set in various ways. For example, application 5 may receive indications of user input to specify recurrence patterns of one or more of test agents 12. In some examples, the recurrence patterns of one or more test agents may be integrated into software code of one or more of test agents 12.

Import/export module 14 may generate test records 24 based on data generated by test agents 12. In some examples, import/export module 14 may store test records 24 in files in a file system, such as a local file system. For instance, in some examples, import/export module 14 may generate test records 24 in XML-based files. Storing test records 24 as files in a file system, may allow application 5 to integrate with version control platforms, such as CVS and SVN.

Furthermore, in some examples, application 5 may store test records 24 in one or more XML files. In some examples, test records 24 may also include data for gathering information (e.g., for performing tests). For instance, test records 24 may include credentials for connecting to target system nodes. In some examples, targets can be authenticated by a Secure Shell (SSH) key, entering a SSH username and password at test time, or by storing plaintext username and password in the XML file. Furthermore, in some examples, plaintext storage of authentication credentials may be replaced with a Java keystore option. This may allow a user to benefit from a simple configuration of many system nodes without many of the security concerns. In accordance with techniques of this disclosure, application 5 may expand version control support to make collaboration easier. For example, a risk model "diff" GUI is an example of how application 5 may expand version control support.

In some examples, when a test agent queries a test target for status information, import/export module 14 writes the results in an XML format consistent with a tree structure of risk model 18. In this way, risk analysis module 10 may use test results 24 to determine a status of an event associated with a tree node of risk model 18 corresponding to the event. For example, a tree node of risk model 18 may correspond to a target system node of distributed computing system 3 overheating. In this example, test results associated with the tree node of risk model 18 may indicate temperature readings of the target system node. Hence, in this example, risk analysis module 10 may determine, based on the data associated with the tree node of risk model 18, whether the processor is overheating.

Test records 24 may contain information that is considered sensitive, such as hostnames, usernames, and configuration details of targets. To mitigate risks of leaking of information, application 5 may provide tools for securely storing test records 24. For example, a user may have an option to save a test record using a standardized encryption scheme, and then read back that data using an integrated user interface (i.e., an interface not external to application 5).

As mentioned briefly above, GUI module 8 may output a dashboard interface for display. The dashboard interface may aggregate test results 24 in a human readable view. For example, the test results generated by certain test agents 12 may indicate whether particular tests have passed or failed. Failure of a test may correspond to an event corresponding to a tree node of risk model 18 occurring. In this example, the dashboard interface may indicate which tests have passed and which tests have failed. Additionally, the dashboard interface may include a tree view that displays risk model 18. For instance, the tree view may map test results to tree nodes in the tree structure of risk model 18.

In some examples, the dashboard interface includes a compliance diagram. The compliance diagram may indicate whether events corresponding to tree nodes of risk model 18 can occur, have occurred, will occur, or are occurring. Risk analysis module 10 may determine, based on test records 24, whether the events corresponding to tree nodes of risk model 18 can occur, have occurred, will occur, or are occurring. In some examples, the compliance diagram may comprise a pie chart or other form of data representation to indicate results of tests run by test agents 12.

Furthermore, in accordance with a technique of this disclosure, the dashboard may include a navigable timeline of configuration changes. In this context, a "configuration change" may correspond to a change in a configuration of a target detected by a test agent. For example, a configuration change may correspond to a change of temperature, change of installed software version, change of enabled/disabled status of particular software, change of available bandwidth, change of network connectivity status, device on/off status, energy availability status (e.g., remaining battery life), number of system nodes in a cluster, or other types of data.

The navigable timeline may enable a user to explore configuration compliance at a glance. For example, the navigable timeline may comprise a line graph that plots a configuration of a target over time. For instance, the line graph may plot bandwidth utilization of the target over time. In some examples, by analyzing the navigable timeline, a user of application 5 may be able to determine whether an event is likely to occur in the future. Furthermore, because a line graph may help the user identify points in time where patterns change, the user may be able to determine a time at which a cause of the event occurred. The user may use other test results to determine what events happened before that time.

In addition, in some examples, supplementary data filters may allow a user to view and compare M&S relevant metrics in a comparison view of the dashboard interface. An M&S relevant metric may comprise any piece of data that can be helpful for monitoring a M&S system. For example, an M&S relevant metrical may include network throughput. If a M&S node is using a disproportionate volume of network bandwidth, that may indicate malicious activity. The supplementary data filters may enable a user to view only metrics relevant to the user.

While in the dashboard view, the user may be able to analyze hardware components more closely. In some examples, tree nodes in risk model 18 describe possible attacks to distributed computing system 3. Furthermore, in some examples, a user may focus on attack goals which are relevant to a particular system node or target group. This may be done by integrating test targets more closely with risk model 18. For instance, there may be disclosed vulnerabilities in a certain specific devices or an entire class of devices. It may be useful to isolate tree members that are effected by the vulnerability. Integrating test targets closely with risk model 18 may enable the test results tree (test record) to have a notion of what the attacks are and how the system may be vulnerable.

Additionally, in some examples, application 5 may support organizing and analyzing hardware components based on relevant attack goals. For example, a M&S system may use internet connected light switches. In this example, if it is found via public disclosure that the light switches are vulnerable to unauthorized remote control, a user of application 5 may have the ability to isolate the switches in the risk model based solely on the fact that the switches are vulnerable to this new attack.

In some examples, import/export module 14 exports risk models as human-readable reports. In various examples, import/export module 14 may export a risk model in various formats. For instance, import/export module 14 may export a risk model as a Portable Document Format (PDF) document, a Rich Text Format (RTF) document, a Hypertext Markup Language (HTML) document, or a document in another format. In accordance with one or more techniques of this disclosure, the human-readable reports may be provided at a level of granularity appropriate for an M&S system to support the potentially heterogeneous nature of M&S systems.

Furthermore, in some examples, import/export module 14 may export one or more of test records 24. In some examples, when exporting a test record, GUI module 8 may output a graphical tree view interface for display and receive, via the graphical tree view interface, an indication of user input to select tree nodes of risk model 18 worthy of including or excluding. The exported data may include not only the test results, but may also include indications of success or failure and/or data indicating implications of success or failure of tests (e.g., attack A cannot occur, event B may occur, etc.).

In some examples, GUI module 8 may output a report configuration page for display. The report configuration page may allow a user to control the granularity of M&S relevant metrics. Thus, GUI module 8 may generate the report configuration page at various arbitrary detail levels. For example, if the user wants to include information about network performance, GUI module 8 may allow the user to exclude unrelated metrics such as power consumption.

To comply with security standards, it is often common practice to document changes to system configurations. In some examples, import/export module 14 supports comparisons between historical test records. A user may then be able to observe a configuration change in a preview and may document that change in a human-readable format for filing. The user may be able to configure how much detail the report includes, depending on the desired amount of context. For example, a change is made to a M&S system datacenter from physical padlocks to internet-connected locks. In this example, the report may only need to include concerns related to physical security. Network performance, for example, could be excluded in the report.

In FIG. 1, analysis computing system 2 and system nodes 4 are shown as separate systems that are external from one another. In some examples, analysis computing system 2 may be included in or otherwise part of, one or more system nodes 4 of distributed computing system 3. In other words, the functionality described herein with respect to analysis computing system 2 may be included in or provided by one or more of system nodes 4.

Figure 2:
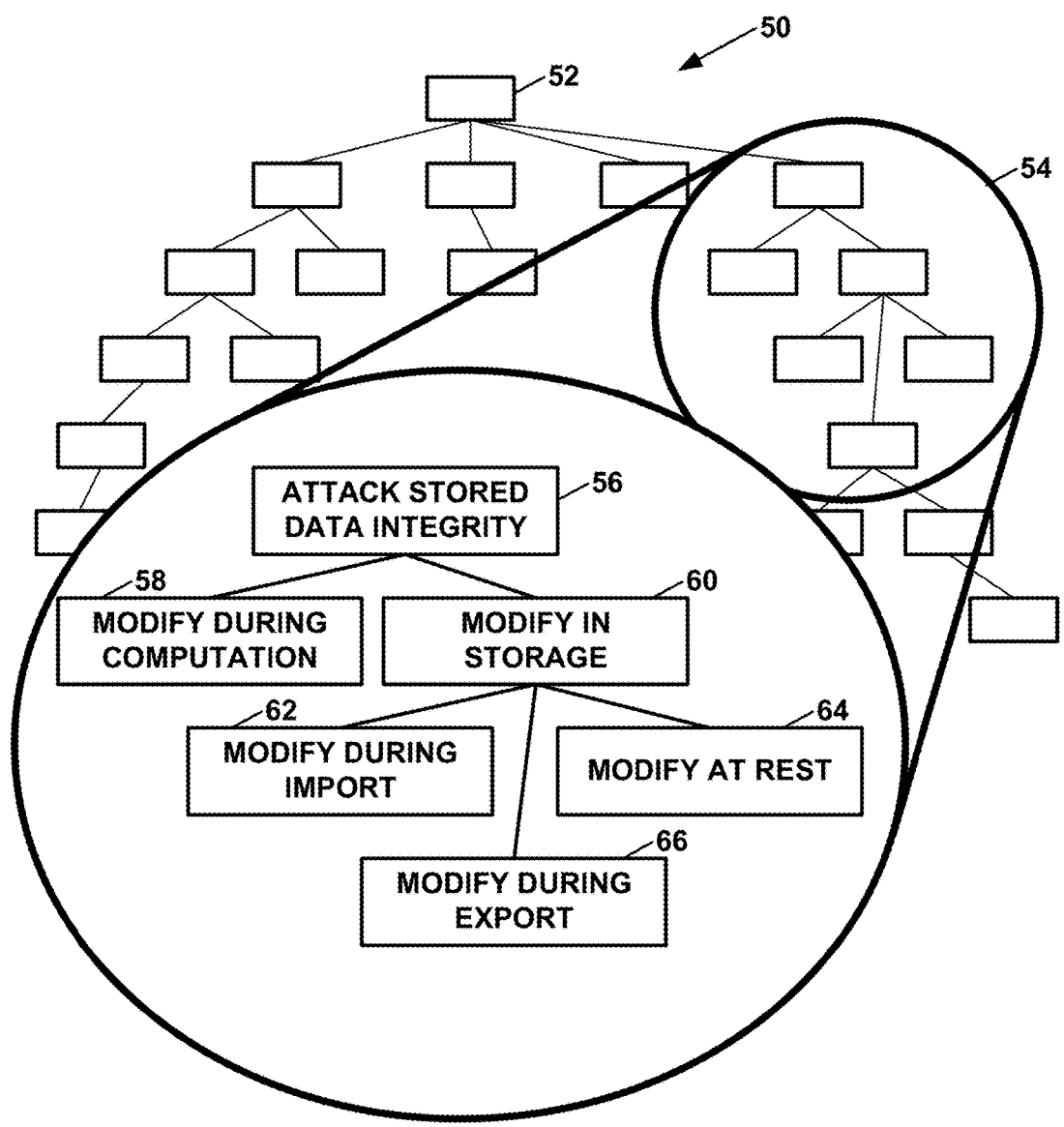
FIG. 2 is a block diagram illustrating an example risk model, in accordance with one or more aspects of this disclosure.

FIG. 2 is a block diagram illustrating an example risk model 50, in accordance with one or more aspects of this disclosure. In the example of FIG. 2, rectangular boxes correspond to tree nodes of risk model 50. A root tree node 52 has no parent tree nodes in risk model 50. In the example of FIG. 2, a portion 54 of risk model 50 is enlarged to show details of a subset of the tree nodes of risk model 50.

As shown in the example of FIG. 2, a tree node 56 corresponds to the event of an attack on stored data integrity. Child tree nodes 58 and 60 of tree node 56 correspond to disjunctive preconditions of a first event (i.e., an attack on stored data integrity). Particularly, tree node 58 corresponds to a second event (i.e., modifying data during computation) and tree node 60 corresponds to a third event (i.e., modifying data in storage). Furthermore, in the example of FIG. 2, child tree nodes 62, 64, and 66 of tree node 60 correspond to disjunctive preconditions of the third event (i.e., modifying data in storage). Particularly, tree node 62 corresponds to a fourth event (i.e., modifying data during import), tree node 64 corresponds to a fifth event (i.e., modifying data at rest), and tree node 66 corresponds to a sixth event (i.e., modifying data during export). In this way, FIG. 2 shows an excerpt of risk model 50 that describes an attack on data integrity. Application 5 may store data associating each of tree nodes 56, 58, 60, 62, 64, and 66 with specific ways the events associated with tree nodes 56, 58, 60, 62, 64, and 66 may occur.

Figure 3:
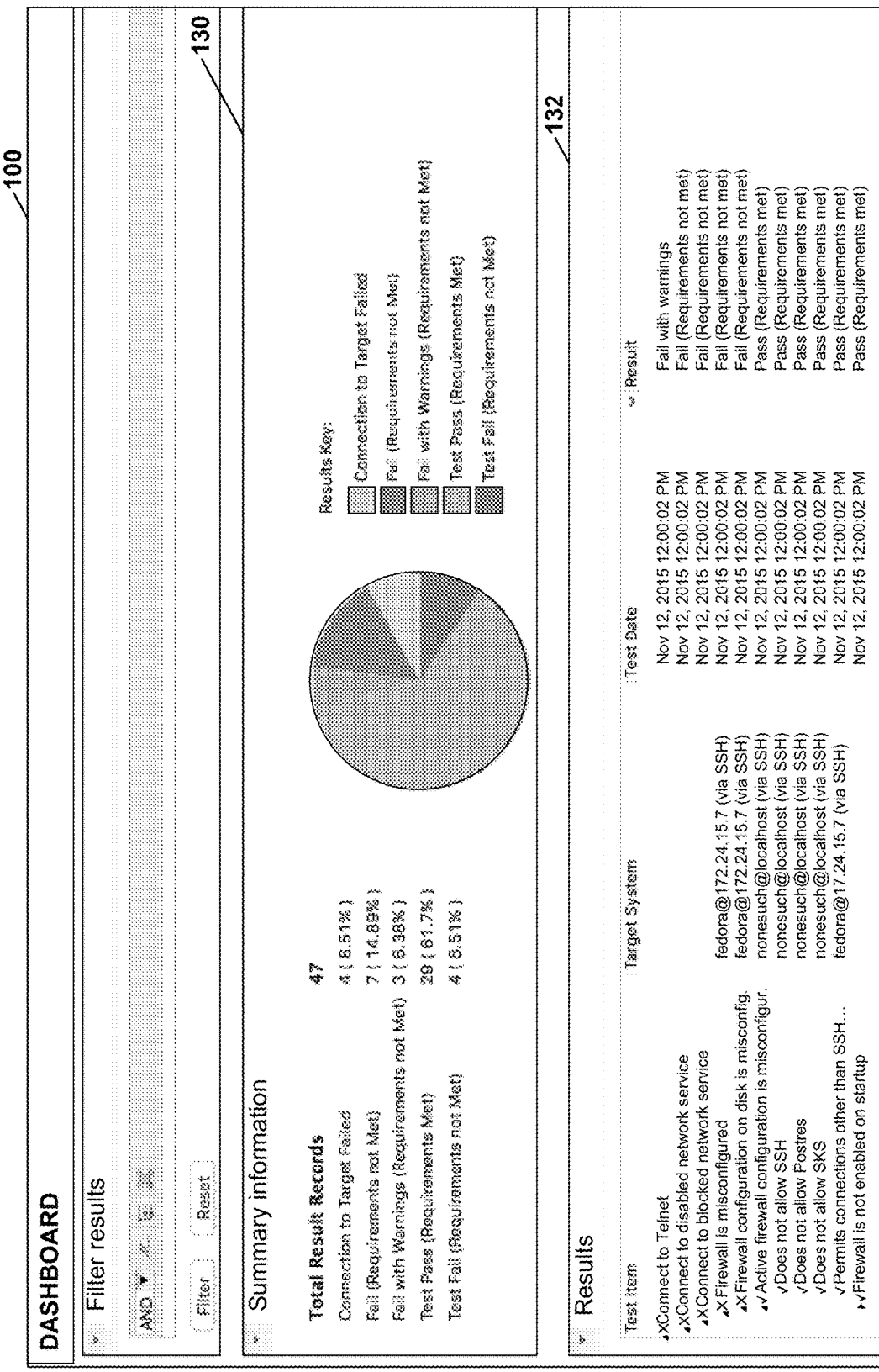
FIG. 3 is an example of a dashboard interface, in accordance with one or more aspects of this disclosure.

FIG. 3 is an example of a dashboard interface 100, in accordance with one or more aspects of this disclosure. Overall summary information may be included in area 130 of dashboard interface 100. The summary information may include the total result records of all tests that have been performed (e.g., by test agents 12), both in numerical and chart (e.g., pie-chart) form. These results may indicate, for example, the number of tests in which the connection to the target (e.g., a target node or node group in distributed computing system 3) failed, the number of tests that failed (such that requirements of the test were not met), the number of tests that failed with warnings (such that the requirements of the test were not met), the number of tests that passed (such that requirements of the test were met), and another category of tests that failed (such that requirements were not met). For various scenarios or instances in which there was a failure, risk analysis module 10 may utilize a risk model (e.g., attack tree) to identify one or more operations or sub-operations in the risk mode (e.g., goals or sub-goals in an attack tree) that may be achieved in view of the failure, and to identify any corresponding vulnerabilities and associated scores in view of the failure, which may be output to the user as a group of graphical representations of such vulnerabilities.

Area 132 of the graphical user interface provides more specific tests results. Each of the test results includes a description of a test item, a name of the target system associated with the test (e.g., one of runtime computing systems 20), a test date, and test results. Each of the test items may be associated with one or more of the operations or sub-operations (e.g., goals or sub-goals) in the hierarchical risk model (e.g., risk model 50 of FIG. 2), and may also be associated with one or more potential vulnerabilities in the model when the corresponding test results indicate a failure. As shown in the "Result" column, test failures may cause the results to indicate that an adverse event is possible, alerting the user to possible issues with the target system(s). In some cases, a user may select one of the test items or results in area 132 to cause the GUI to display or highlight one or more tree nodes within the tree structure (e.g., shown in FIG. 2) that correspond to the test result (e.g., failure) and associated vulnerabilities, allowing the user to identify potential vulnerabilities in the model that are associated with the test results.

Although FIG. 3 presents test results in terms of passing and failing, in other examples, the data gathering routines need not be expressing in terms of passing and failing, but rather may be presented in terms of events occurring or not occurring.

Furthermore, in the example of FIG. 3, tree nodes in the test model shown in area 132 are expandable and collapsible to allow a user to view parts of the test model of interest. For instance, in the example of FIG. 3, the user may be able to drill down in the test model to determine which event caused the event of "connect to Telnet" to occur. Additionally, "x" marks and checkmarks are used to indicate tests that have failed and tests that have passed, respectively. Additionally, the "target system" column of area 132 identifies system nodes associated with the shown tree nodes of the test model.

Figure 4:
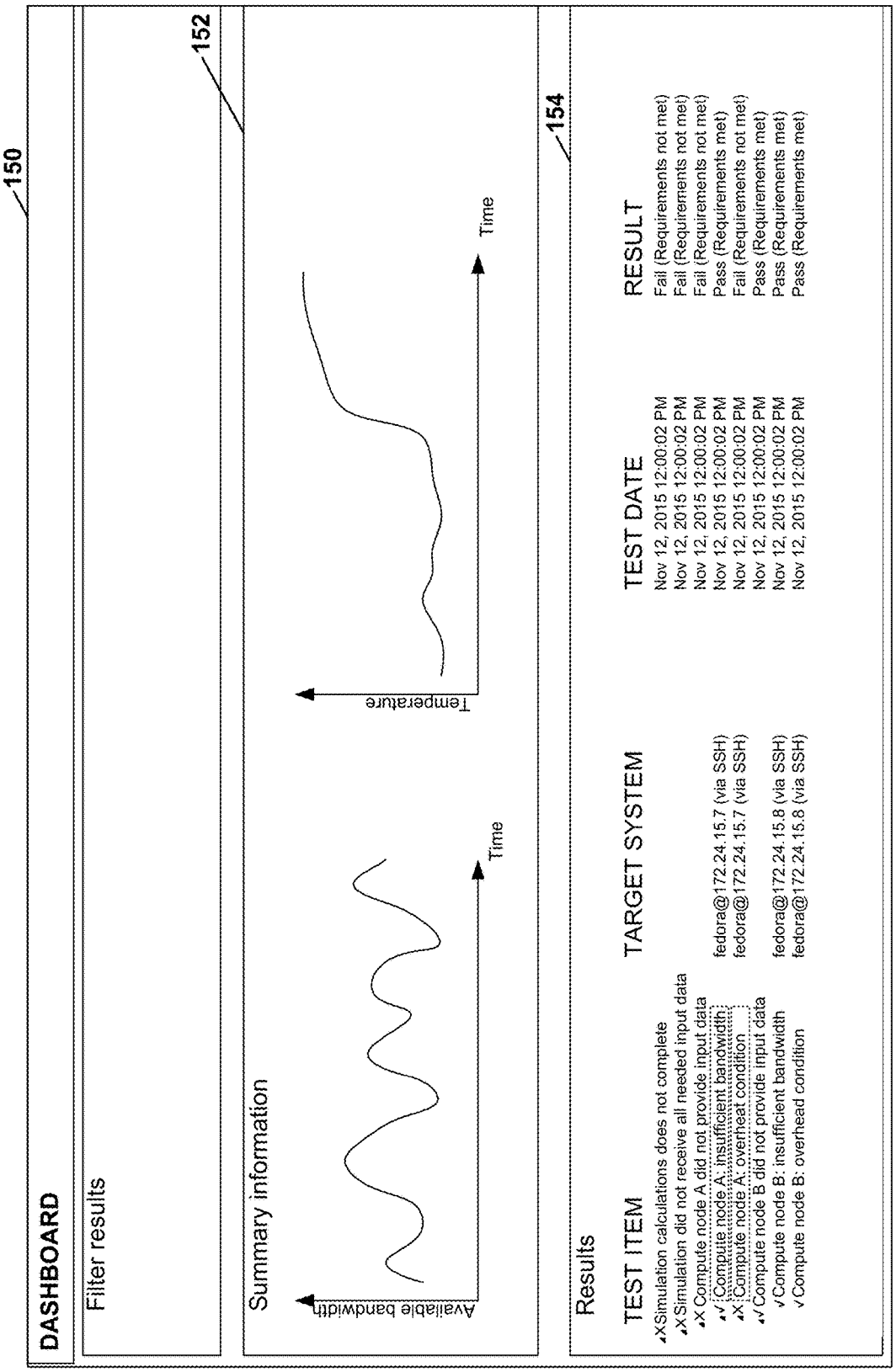
FIG. 4 is an example of a dashboard interface, in accordance with one or more aspects of this disclosure.

FIG. 4 is an example of a dashboard interface 150, in accordance with one or more aspects of this disclosure. Dashboard interface 150 is similar to dashboard interface 100 (FIG. 3). However, rather than showing a generalized summary of multiple tests, as shown in area 130 of dashboard interface 100, area 152 includes two-dimensional charts showing details of selected tree nodes of a risk model shown in area 154 of dashboard interface 150. Particularly, in the example of FIG. 4, the risk model shown in area 154 relates to an event of simulation calculations not completing and potential reasons why the simulation calculations do not complete. In this example, two of the possible reasons why the simulation calculations do not complete is that either a compute node A or a compute node B of distributed computing system 3 did not provide input data. For each compute node of compute node A and compute node B, the compute node may fail to provide the input data because of insufficient bandwidth or an overheating condition occurring.

In response to receiving an indication of user input to select a tree node in area 154, GUI module 8 may output a representation of data gathered with respect to the selected tree node in area 152. In some instances, the representation of the gathered data may be a multi-dimensional (e.g., 2-D, 3-D) chart of the gathered data, a text representation of the gathered data, or another form of data representation. Thus, in the example of FIG. 4, analysis computing system 2 may output, for display, a multi-dimensional chart comprising a plurality of data points, each respective data point of the plurality of data points based on (e.g., equal to, calculated using, etc.) a measurement gathered as part of a respective performance of the data gathering routine of a test agent. In some examples, algorithms for generating a representation of data gathered by a test agent may be programmed into the test agent, into risk analysis module 10, or elsewhere. In some examples, the representation of the data may be user configured.

As shown in the example of FIG. 4, GUI module 8 has received indications of user input to select the tree nodes for compute node A having insufficient bandwidth and compute node A having the overheating condition. In response, GUI module 8 has output a 2-dimensional chart showing bandwidth availability of compute node A over time and a 2-dimensional chart showing temperature of compute node A over time. Based on the charts, a user may be able to see the overheating condition of compute node A.

Figure 5:
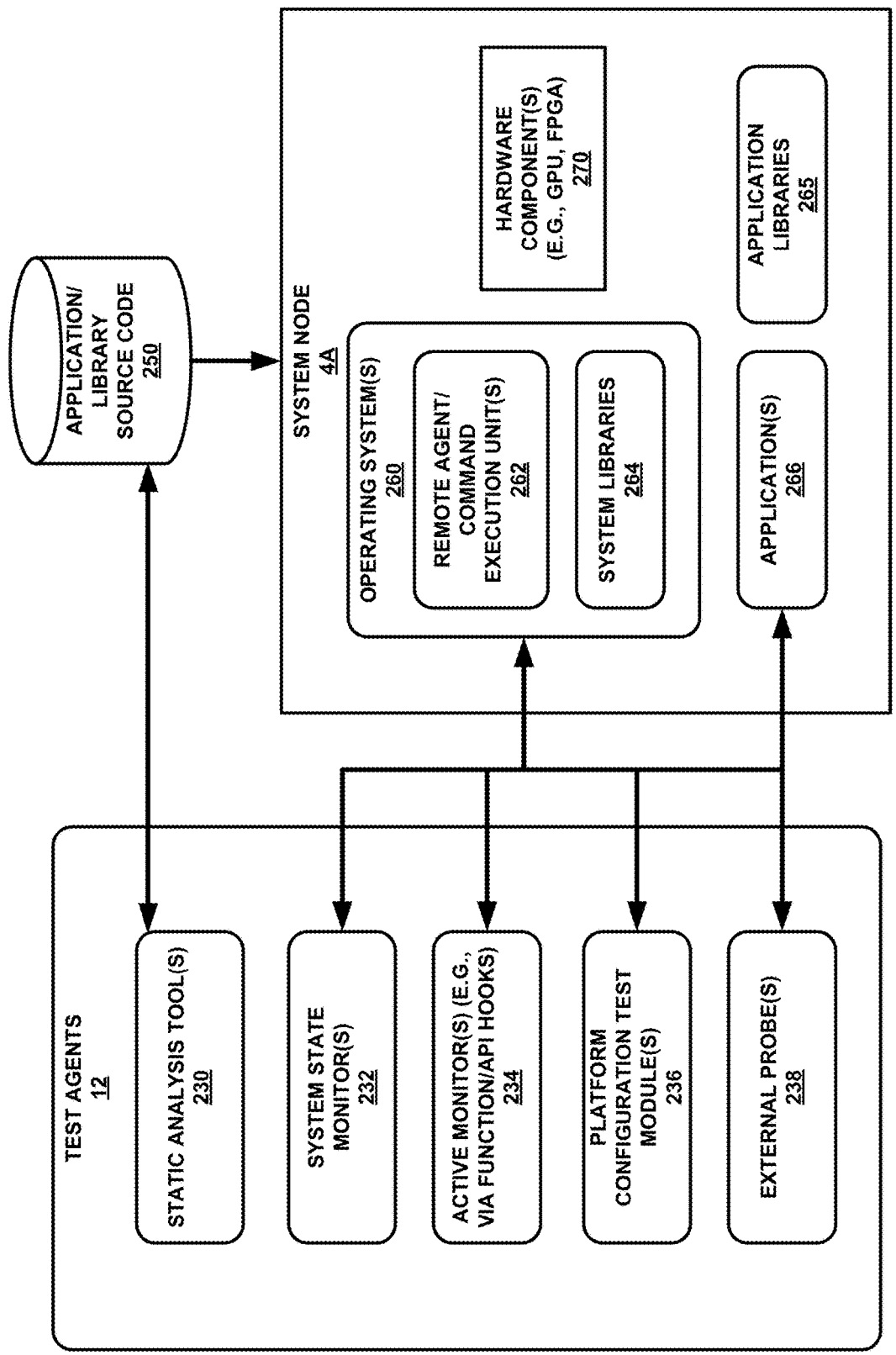
FIG. 5 is a block diagram illustrating one example of various components shown in FIG. 1, in accordance with one or more aspects of the present disclosure.

FIG. 5 is a block diagram illustrating one example of various components shown in FIG. 1, in accordance with one or more aspects of the present disclosure. FIG. 5, for example, illustrates further example details of test agents 12 and system node 4A shown in FIG. 1.

As illustrated in FIG. 5, system node 4A may include one or more operating systems 260, one or more applications 266, one or more application libraries 265, and one or more hardware components 270 (e.g., one or more GPUs, one or more FPGAs). Operating systems 260 includes one or more remote agent/command execution units 262 and one or more system libraries 264. Although shown as separate blocks in FIG. 5, applications 266 may, in some cases, be included in operating systems 260.

Test agents 12, as illustrated in FIG. 5, may include one or more static analysis tools 230, one or more system state monitors 232, one or more active monitors (e.g., function and/or API hooks), one or more platform configuration test modules 236, and one or more external probes 238. Test agents 12 are part of analysis computing system 2. Analysis computing system 2 may monitor execution of applications 266 on system node 4A.

Static analysis tools 230 are capable of performing static analyses of any source code that is compiled or otherwise processed for execution of operating systems 260, including remote agent/command execution units 262 and libraries, and/or execution of applications 266 of system node 4A. In some cases, source code may be unavailable, in which case static analysis tools 230 may not be used or implemented. However, in other cases, such as illustrated in the example of FIG. 5, application and/or library source code 50 may be available for analysis by static analysis tools 230. In certain examples, as noted further below, application/library source code 250 may include Open Computing Language (OpenCL) code. In the example of FIG. 5, static analysis tools 230 may analyze application/library source code 250 that is compiled or otherwise processed for execution of system libraries 264, application libraries 265, and/or applications 266. Static analysis tools 230 may analyze code 250 based on one or more rules to identify, for instance, potentially malicious, unusual, or unexpected function calls or sequences of instructions that may cause risks or other vulnerabilities to system nodes 4 during use of system libraries 264, application libraries 265, and/or execution of applications 266. Static analysis tools 230 may provide analysis results to risk analysis module 10 (FIG. 1) for further processing, as described further below.

System state monitors 232 may perform monitoring of operating systems 260 and/or applications 266. In some cases, system state monitors may perform one or more system state tests to obtain test result or monitoring information from operating systems 260 and/or applications 266. As one example, system state monitors 232 may monitor any changes to file systems used by operating systems 260 and/or applications 266, and may also, in some cases, determine which programs or processes are executing at a given time. In some instances, system state monitors 232 may invoke or otherwise utilize remote agent/command execution units 262 in system node 4A. Remote agent/command execution units 262 are operable to perform certain actions on system node 4A and provide corresponding results or other information (e.g., changes to file systems, information about which programs are executing) back to system state monitors 232 of analysis computing system 2. System state monitors 232 may provide monitoring information to risk analysis module 10 (FIG. 1) for further processing.

Active monitors 234 may perform active monitoring of system node 4A during execution of applications 266. In some examples, active monitors 234 may make use of function and/or API hooks that are implemented in system node 4A. In these examples, as further illustrated in FIG. 5, system node 4A may provide wrappers or instrumented code for function and/or API calls that are invoked by applications 266 during execution. When applications 266 invoke these function and/or API calls, the wrappers or instrumented code intercept such calls and are capable of performing other analysis or monitoring functions, such as reporting the entire call stack and/or arguments for selected functions within a binary, system libraries 264, application libraries 265, or operating system 260.

FIG. 6 is a screen diagram illustrating an example user interface 300 for associating tree nodes of a risk model with test agents, in accordance with one or more aspects of the present disclosure. In the example of FIG. 6, an illustrated risk model 302 represents a tree structure for an attacker's goals and methods with respect to one or more attacks against a target, such as system node 4A. Furthermore, in the example of FIG. 6, risk model 302 includes five distinct root tree nodes that each represents a respective event (which, in the example of FIG. 6, are attack goals).

The five root tree nodes in risk model 302 of FIG. 6 represent the following five top-level events: breach confidentiality of distributed computing system 3 (FIG. 1), compromise integrity of distributed computing system 3, reduce availability of distributed computing system 3, misuse services of distributed computing system 3, and force compliance or increase liability with respect to distributed computing system 3. In addition, FIG. 6 illustrates example sub-events of certain ones of these root-level events. For example, the tree node of risk model 302 representing the event of breaching confidentiality has four sub-tree nodes that represent the following respective sub-events: read private information in transit, read private data at rest or a specific computer or device, convince a human to directly reveal private information, and deduce private data by reading public data. In addition, the tree node of risk model 302 representing the event of compromising integrity has three sub-tree nodes that represent the following respective sub-events: modify private information in transit, modify private data at rest on a specific computer or device, and convince a human to directly modify private information. As shown, the higher-level events may share one or more common sub-events, which may, in some examples, be represented by common sub-tree nodes in risk model 302.

Sub-events may be disjunctive (e.g., one of the sub-events must be met) or conjunctive (e.g., all sub-events must be met) in order for the parent event (e.g., root-level event) to be satisfied. In some examples, each respective leaf-level sub-event may be met because of a respective vulnerability in distributed computing system 3. For example, an attacker might insert a known-weak encryption algorithm, allowing an adversary to easily decode encrypted data in transit. Therefore, in the example of FIG. 6, risk model 302 may represent how vulnerabilities (e.g., vulnerabilities based on execution of malware) can be exploited to achieve an attacker's possible aims on distributed computing system 3, or specific target system nodes or target groups in distributed computing system 3.

In accordance with a technique of this disclosure, a GUI containing a representation of a risk model may be expanded or collapsed at each non-leaf tree node. Thus, a user may be able to focus on parts of the risk model currently of interest. For instance, in the example of FIG. 6, the tree nodes corresponding to "Breach Confidentiality" and "Compromise Integrity" are expanded while tree nodes corresponding to "Reduce Availability," "Misuse Services," and "Force Non-Compliance or Increase Liability."

As further shown in the non-limiting example of FIG. 6, in addition to displaying the details of risk model 302, user interface 300 may also display additional details, as shown on the right-hand side of the graphical user interface, in area 304 of FIG. 6. For example, various additional goal details may be provided for any of the tree nodes in risk model 302. In FIG. 6, application 5 has received an indication of user input to select a sub-tree node 306 representing a sub-event of convincing a human to directly reveal private information, which occurs under the parent tree node representing the goal to breach confidentiality. The selected sub-tree node (i.e., sub-tree node 306) is highlighted in risk model 302 of FIG. 6. On the right-hand side of FIG. 6, the name of the selected sub-event is shown, and any available and additional description or documentation may be provided with respect to the selected event, although none are shown in the example of FIG. 6.

Thus, in the example of FIG. 6, analysis computing system 2 may receive an indication of user input to associate a test agent with a tree node in risk model 18. Furthermore, in response to receiving the indication of user input to associate the test agent with the tree node, analysis computing system 2 may generate data (e.g., agent-model data 22) associating the test agent with the tree node.

User interface 300 may also include further details regarding testing procedures that may be performed in the portion of area 304 labeled "Testing Procedures," although none are shown in the example of FIG. 6. These testing procedures may include procedures for determining or evaluating whether an event or sub-event associated with the selected tree node of risk model 302 has occurred or can occur. The passing of tests that are included in the testing procedure may indicate that the event or sub-event associated with the selected tree node of risk model 302 cannot take place.

In the example of FIG. 6, area 304 includes a dropdown box 310. In response to receiving an indication of user selection of dropdown box 310, GUI module 8 may display a list of available testing procedures to associate with the selected tree node of risk model 302. Testing procedures in the list of available testing procedures may correspond to respective test agents (e.g., test agents 12 of FIG. 1). In response to receiving an indication of user input to select one of the available testing procedures listed in dropdown box 310, GUI module 8 may generate data (e.g., agent-model data 22 of FIG. 1) associating the selected available testing procedure with the selected tree node of risk model 302. In this way, user interface 300 may enable a user of application 5 to associate test agents with tree nodes of risk model 302.

In the example of FIG. 6, user interface 300 also includes further details regarding attributes and computed values in a portion 308 of area 304 labeled "Attributes and Computed Values." The attributes and computed values may include software data, such as fixed or dynamic values, associated with the respective event or sub-event. Software modules may be used to compute particular values, such as attack costs. In the example of FIG. 6, the software modules are shown that relate to remediation costs and attack costs. The attack cost may be associated with the attacker's cost based on test results, and the remediation cost may be associated with any remediation costs for fixing one or more items based on unsuccessful attempts to prevent an attack. A user may use controls 308 to add, configure, or remove software modules for determining attributes, costs, and other data based on data gathered by test agents.

Risk analysis module 10 is configured to perform automated evaluations and computations on risk models, testing on-line to see whether particular events can occur (e.g., based on whether known weak configurations or libraries are in use, such as in system libraries 264 (FIG. 5) and/or application libraries 265 (FIG. 5)). Risk analysis module 10 may compute metrics and/or costs based on component metrics. Risk analysis module 10 may analyze monitoring information provided by test agents 12, which may include test results, and may also, in some cases, use information provided by local knowledge base 16 and/or central knowledge base 28. For example, central knowledge base 28 may include information about known or common vulnerabilities and exposures. Risk analysis module 10 may summarize the results of the analyses, for example, in a dashboard that is output for display by GUI module 8, which may enable a user to identify and even potentially pinpoint risks and potentially cost-effective means to address the identified risks. In various examples, the structure of an attacker's methodologies is implicit in the attack tree model used by risk analysis module 10, allowing severity or complexity information reported by individual ones of test agents 12, or for individual components, to appropriately bubble-up to root-level software assurance goals.

In a risk model output via GUI module 8, risk analysis module 10 may compute aggregate risks or other statistics for one or more of the potential vulnerabilities. In some examples, the risk model may identify potentially cost-effective places within the risk model to address such potential vulnerabilities. For instance, if an analyst assigned costs to fix or re-implement various components (e.g., components of system node 4A, such as applications 266 (FIG. 5)), the risk model may help identify or potentially pinpoint the most cost-effective places to address such vulnerabilities (e.g., in applications 266, system libraries 264 (FIG. 5), application libraries 265 (FIG. 5)) given the test results.

Figure 7:
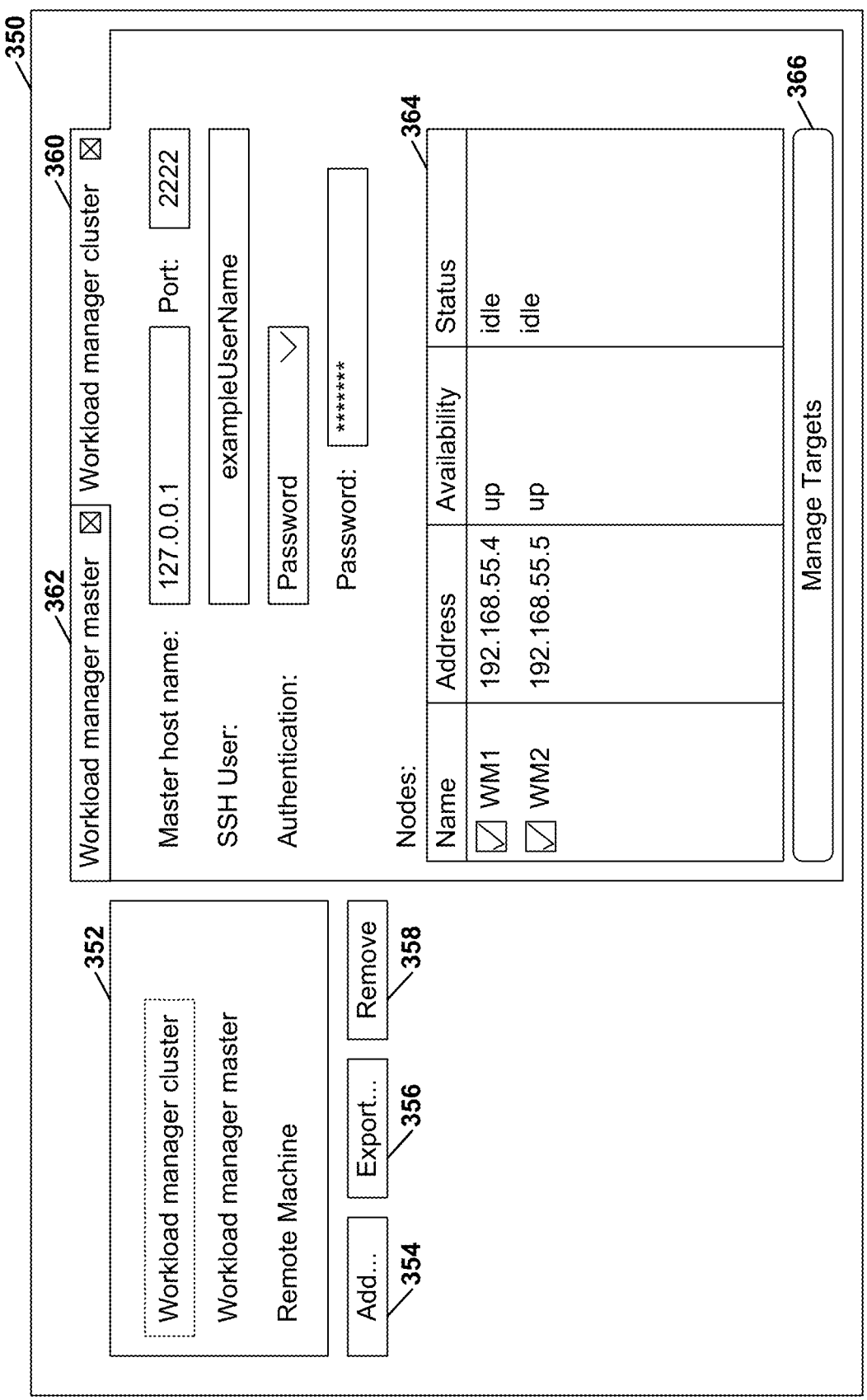
FIG. 7 is an example screen diagram illustrating an example target configuration interface for defining target groups, in accordance with one or more aspects of this disclosure.

FIG. 7 is an example screen diagram illustrating an example target configuration interface 350 for defining target groups, in accordance with one or more aspects of this disclosure. In response to receiving indications of user input directed to target configuration interface 350, application 5 (FIG. 1) may generate information defining a target group (e.g., group definition data 26). As discussed elsewhere in this disclosure, a target group may include one target system node or a plurality of target system nodes of distributed computing system 3 (FIG. 1).

In the example of FIG. 7, target configuration interface 350 comprises a group selection area 352 that includes a list of already-defined target groups. In the example of FIG. 7, group selection area 352 lists three target groups: "Workload manager cluster," "Workload manager master," and "Remote Machine." Additionally, target configuration interface 350 includes buttons 354, 356, and 358 to add, export, and remove target groups, respectively. In response to receiving an indication of user input selecting button 354, GUI module 8 may output for display a dialog box prompting a user to input a name of a new target group, after which GUI module 8 may display the name of the new target group in group selection area 352. In response to receiving an indication of user input selecting button 358, GUI module 8 may remove whichever target group is selected in group selection area 352. In response to receiving an indication of user input selecting button 356, import/export module 14 may export data regarding one or more of the target groups listed in group selection area 352. For instance, in some examples, in response to receiving an indication of user input selecting button 356, import/export module 14 may export data regarding whichever target group is selected in group selection area 352. In some examples, in response to receiving an indication of user input selecting button 356, import/export module 14 may export data regarding each target group listed in group selection area 352.

As noted above, GUI module 8 may receive an indication of user input to select a target group in group selection area 352. In response to receiving an indication of user input to select a target group in group selection area 352, GUI module 8 may output, within target configuration interface 350, a tab corresponding to the selected target group. In the example of FIG. 7, GUI module 8 has received an indication of user input to select the target group titled "Workload manager cluster." Accordingly, GUI module 8 has output, within target configuration interface 350, a tab 360 corresponding to the target group titled "Workload manager cluster." For ease of use, target configuration interface 350 may also include tabs, such as tab 362, corresponding to other target groups (e.g., other previously selected target groups).

In the example of FIG. 7, a tab corresponding to a selected target group includes a node list area that lists system node in the selected target group. For instance, tab 360 includes a node list area 364 that lists system nodes in the "Workload manager cluster" target group. Furthermore, the tab corresponding to the selected target group may include a manage targets button, such as button 366. In response to receiving an indication of user input to select the manage targets button, GUI module 8 may output, for display, UI features (e.g., a dialog box) for receiving indications of user input indicating a system node of distributed computing system 3 to add to the selected target group. In some examples, as part of receiving the indication of user input to add a system node to the selected target group, GUI module 8 may receive an indication of user input specifying an Internet Protocol (IP) address of the system node. Furthermore, in some examples, GUI module 8 may receive an indication of user input from the displayed UI features to remove a system node from the selected target group.

Thus, in the example of FIG. 7, analysis computing system 2 may output, for display on display device 6, target configuration interface 350. Additionally, analysis computing system 2 may receive, via target configuration interface 350, indications of user input to define a target such that the target comprises the one or more system nodes in distributed computing system 3. In response to receiving the indications of the user input to define the target such that the target comprises the one or more system nodes (e.g., one system node, a plurality of system node, etc.) in distributed computing system 3, analysis computing system 2 may define the target such that the target comprises the one or more system nodes in distributed computing system 3. As shown in the example of FIG. 7, analysis computing system 2 may receive indications of user input to define the target such that the target comprises a plurality of system nodes in distributed computing system 3 and an indication of user input to define a name of the target (e.g., "Workload manager cluster," "Workload manager master," etc.). Furthermore, as shown in the example of FIG. 7, analysis computing system 2 may receive indications of user input specifying identifiers (e.g., names, addresses, etc. as indicated in area 364) of the one or more system nodes in distributed computing system 3.

In some examples, a target group has a master system node. A master system node of a target group may control target system nodes of the target group, collect data from target system nodes of the target group, or perform some other special function for target system nodes in the target group. In the example of FIG. 7, a tab corresponding to a selected target group may include UI features for specifying how to communicate with the master system node of the selected target group. For instance, in the example of FIG. 7, tab 360 includes features through which GUI module 8 may receive indications of user input specifying a host name of the master system node (e.g., an IP address of the master system node), a port number to use for communicating with the master system node, a user name for use in authenticating with the master system node, and an authentication type. In the example of FIG. 7, since a password authentication type is selected, tab 360 includes a password field.

Figure 8:
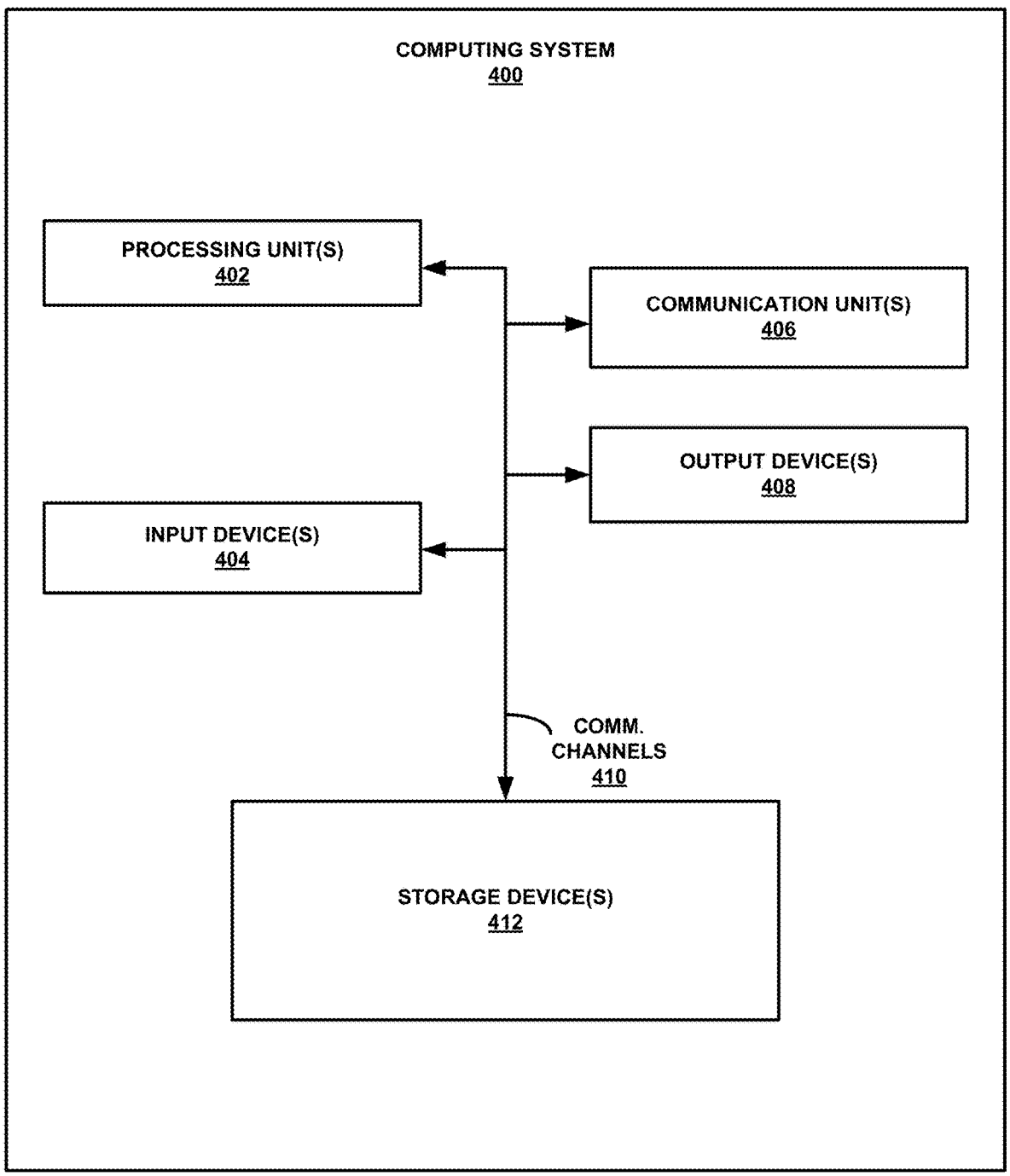
FIG. 8 is a block diagram illustrating further details of an example computing system, in accordance with one or more aspects of the present disclosure.

FIG. 8 is a block diagram illustrating further details of an example computing system 400, such as analysis computing system 2 (FIG. 1) or one of system nodes 4 (FIG. 1), in accordance with one or more aspects of the present disclosure. FIG. 8 illustrates only one particular example of computing system 400, and many other examples of computing system 400 may be used in other instances and may include a subset of the components shown, or may include additional components not shown, in FIG. 8.

As shown in the example of FIG. 8, computing system 400 includes one or more processing units 402, one or more input devices 404, one or more communication units 406, one or more output devices 408, and one or more storage devices 412. Communication channels 410 may interconnect each of the components 402, 404, 406, 408, and 412 for inter-component communications (physically, communicatively, and/or operatively). In some examples, communication channels 410 may include a system bus, a network connection, an inter-process communication data structure, or any other method for communicating data between hardware and/or software.

One or more input devices 404 of computing system 400 may receive input. Examples of input are tactile, audio, and video input. Examples of input devices 404 include a presence-sensitive screen, touch-sensitive screen, mouse, keyboard, voice responsive system, video camera, microphone or any other type of device for detecting input from a human or machine.

One or more output devices 408 of computing system 400 may generate output. Examples of output are tactile, audio, and video output. Examples of output devices 408 include a presence-sensitive screen, sound card, video graphics adapter card, speaker, cathode ray tube (CRT) monitor, liquid crystal display (LCD), or any other type of device for generating output to a human or machine. Output devices 408 may include display devices such as cathode ray tube (CRT) monitor, liquid crystal display (LCD), or any other type of device for generating tactile, audio, and/or visual output.

One or more communication units 406 of computing system 400 may communicate with one or more other computing systems or devices via one or more networks by transmitting and/or receiving network signals on the one or more networks. Examples of communication units 406 include a network interface card (e.g. such as an Ethernet card), an optical transceiver, a radio frequency transceiver, or any other type of device that can send and/or receive information, such as through a wired or wireless network. Other examples of communication units 406 may include short wave radios, cellular data radios, wireless Ethernet network radios, as well as universal serial bus (USB) controllers.

One or more storage devices 412 within computing system 400 may store information for processing during operation of computing system 400 (e.g., computing system 400 may store data accessed by one or more modules, processes, applications, or the like during execution at computing system 400). In some examples, storage devices 412 on computing system 400 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. In some cases, storage devices 412 may include redundant array of independent disks (RAID) configurations and one or more solid-state drives (SSD's).

Storage devices 412, in some examples, also include one or more computer-readable storage media. Storage devices 412 may be configured to store larger amounts of information than volatile memory. Storage devices 412 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 412 may store program instructions and/or data associated with one or more software/firmware elements or modules.

For example, when computing system 400 comprises an example of analysis computing system 2 shown in FIG. 1, storage devices 412 may store local knowledge base 16. In addition, storage devices 412 may store instructions and/or data associated with application 5, including, GUI module 8, risk analysis module 10, test agents 12, and import/export module 14, shown in FIG. 1. With respect to test agents 12 shown in FIG. 5, storage devices 412 may store instructions and/or data associated with static analysis tools 230, system state monitors 232, active monitors 234, platform configuration test modules 236, and external probes 238. Storage devices 412 may also store risk model 18, agent-target data 30, agent-model data 22, test records 24, and group definition data 26.

In other examples, when computing system 400 comprises an example of one or more of system node 4 (e.g., system node 4A), storage devices 412 may store instructions and/or data associated with operating systems 260 (including remote agent/command execution units 262 and system libraries 264), applications 266, and application libraries, as shown in FIG. 5.

Computing system 400 further includes one or more processing units 402 that may implement functionality and/or execute instructions within computing system 400. For example, processing units 402 may receive and execute instructions stored by storage devices 412 that execute the functionality of the elements and/or modules described herein. These instructions executed by processing units 402 may cause computing system 400 to store information within storage devices 412 during program execution. Processing units 402 may also execute instructions of an operating system to perform one or more operations described herein. In those examples in which computing system 400 comprises one or more of system nodes 4, processing units 402 may comprise an example of one or more of hardware components 270 shown in FIG. 5 (e.g., one or more GPUs, one or more FPGAs).

Figure 9:
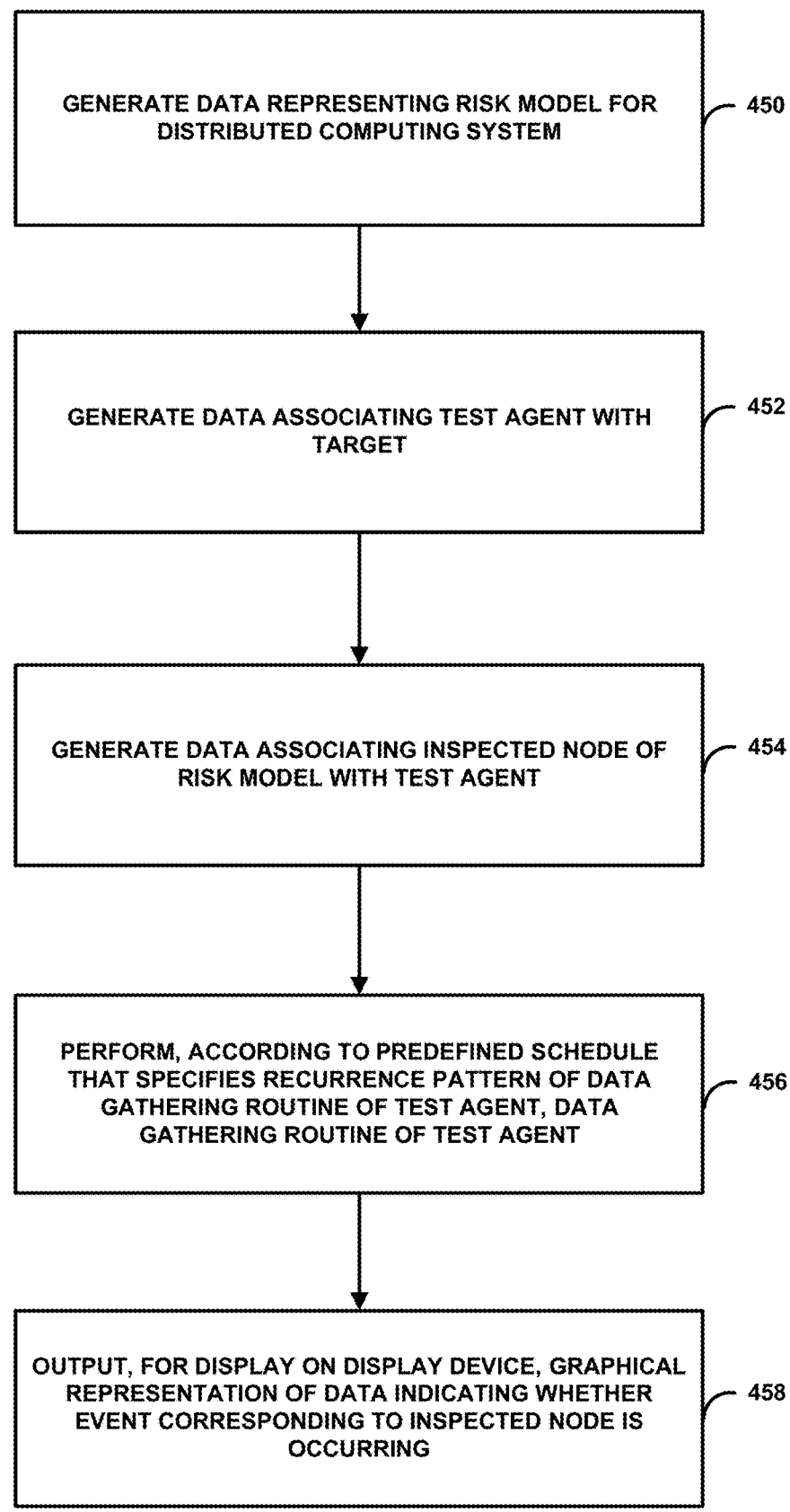
FIG. 9 is a flow diagram illustrating an example process that may be performed by a computing system, in accordance with one or more aspects of the present disclosure.

FIG. 9 is a flow diagram illustrating an example process that may be performed by a computing system, in accordance with one or more aspects of the present disclosure. For example, the process illustrated in FIG. 9, which may comprise one or more operations, may be performed by analysis computing system 2 (FIG. 1).

As illustrated in FIG. 9, analysis computing system 2 may generate data representing a risk model (e.g., risk model 18) for a distributed computing system (450). Analysis computing system 2 may generate the data representing the risk model in accordance with examples provided elsewhere in this disclosure. For instance, analysis computing system 2 may be configured to generate the data representing the risk model as XML data. The risk model comprises a plurality of tree nodes organized as a tree. In examples where the risk model is represented as XML data, analysis computing system 2 may generate a pair of XML tags enclosing data for the tree, and for each respective node of the tree, generate a respective pair of tags in the data for the tree enclosing data corresponding to the respective node and child nodes of the respective node, if any. For each respective tree node of the risk model, the respective tree node corresponds to a respective event that may befall the distributed computing system. For each respective non-leaf tree node of the risk model, the events corresponding to child tree nodes of the respective non-leaf tree node are preconditions of the event corresponding to the respective non-leaf tree node. In the example of FIG. 9, the tree nodes of the risk model include an inspected tree node.

Furthermore, in the example of FIG. 9, analysis computing system 2 may generate data (e.g., agent-target data 20) associating a test agent with a target (452). Analysis computing system 2 may generate the data associating the test agent with the target in accordance with examples provided elsewhere in this disclosure. For example, analysis computing system 2 may be configured to generate the data associating the test agent with the target as XML, data. For instance, in this example, analysis computing system 2 may generate XML tags enclosing data associated with the target and include within the data associated with the target XML tags that enclose an identifier of the test agent. The test agent is configured to perform a data gathering routine that gathers data from the target associated with the test agent. The target associated with the test agent comprises one or more system nodes in distributed computing system 3. Analysis computing system 2 may also generate data (e.g., agent-model data 22) associating the inspected tree node of the risk model with the test agent (454). Analysis computing system 2 may generate the data associating the inspected tree node with the test agent in accordance with examples provided elsewhere in this disclosure. For example, analysis computing system 2 may be configured to generate the data associating the inspected tree node with the test agent as XML data. For instance, in this example, analysis computing system 2 may generate XML tags enclosing the data associated with the test agent and within the data associated with the test agent may generate XML tags identifying parts of the data associated with the inspected tree node. The data (e.g., test records 24) gathered by the data gathering routine of the test agent may indicate whether the event corresponding to the inspected tree node is occurring.

In this example of FIG. 9, analysis computing system 2 may perform, according to a predefined schedule that specifies a recurrence pattern of the data gathering routine of the test agent, the data gathering routine of the test agent (456). For instance, if the recurrence pattern of the data gathering routine of the test agent is every minute, analysis computing system 2 may perform the data gathering routine of the test agent once every minute.

Furthermore, in the example of FIG. 9, analysis computing system 2 may output a representation of the data indicating whether the event corresponding to the inspected tree node is occurring (458). For instance, analysis computing system 2 may output a graphical representation of the data as described in examples provided elsewhere in this disclosure. For instance, analysis computing system 2 may generate a multi-dimensional chart based on the gathered data. In some examples, analysis computing system 2 may output data in a human- or machine-readable format, such as a PDF document, word processor document, spreadsheet document, or other type of document.

In some examples, analysis computing system 2 may determine, based on the data gathered by the data gathering routine of the test agent, one or more metrics. The graphical representation of the data may include the one or more metrics. For instance, in one example, analysis computing system 2 may determine, based on the data gathered by the data gathering routine of the test agent, a cost to remediate the event corresponding to the inspected tree node. For instance, based on a determination that the event has occurred, analysis computing system 2 may retrieve, from a database, a predetermined cost estimate corresponding to the event. In another example, analysis computing system 2 may determine a difficulty of an attacker causing the event corresponding to the inspected tree node. For instance, based on a determination that the event has occurred, analysis computing system 2 may retrieve, from a database, a predefined estimate of how difficult it would be for an attacker to cause the event.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise RAM, read-only memory (ROM), EEPROM, compact disc ROM (CD-ROM), or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSP's), general purpose microprocessors, application specific integrated circuits (ASIC's), FPGA's, or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses. In some examples, techniques of this disclosure may be performed by processing circuitry, such as one or more microprocessors, microcontrollers, or other types of circuits. In some examples, the processing circuitry read instructions from a memory and execute the instructions, causing the processing circuitry to perform various actions. In some examples, various actions are hardwired into the processing circuitry. Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperable hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:
1. A method comprising:
generating, by an analysis computing system comprising processing circuitry, data representing a risk model for a distributed computing system, wherein:
the risk model comprises a plurality of tree nodes organized as a tree,
for each respective tree node of the risk model, the respective tree node corresponds to a respective event that may befall the distributed computing system,
for each respective non-leaf tree node of the risk model, the events corresponding to child tree nodes of the respective non-leaf tree node are preconditions of the event corresponding to the respective non-leaf tree node, and
the tree nodes of the risk model include a first inspected tree node and a second inspected tree node;
generating, by the processing circuitry of the analysis computing system, data associating a first test agent with a first target, the first test agent configured to perform a data gathering routine that gathers data from the first target associated with the first test agent, the first target associated with the first test agent comprising a first set of one or more system nodes in the distributed computing system;
generating, by the processing circuitry, data associating the first inspected tree node of the risk model with the first test agent, the data gathered by the data gathering routine of the first test agent comprising data indicating whether the event corresponding to the inspected tree node is occurring or has occurred;
generating, by the processing circuitry of the analysis computing system, data associating a second test agent with a second target, the second test agent being different from the first test agent, the second test agent configured to perform a data gathering routine that gathers data from the second target associated with the second test agent, the second target associated with the second test agent comprising a second set of one or more system nodes in the distributed computing system;

generating, by the processing circuitry, data associating the second inspected tree node of the risk model with the second test agent, the data gathered by the data gathering routine of the second test agent comprising data indicating whether the event corresponding to the inspected tree node is occurring or has occurred;

performing, by the processing circuitry, according to a first predefined schedule that specifies a recurrence pattern of the data gathering routine of the first test agent, the data gathering routine of the first test agent;

performing, by the processing circuitry, according to a second predefined schedule that specifies a recurrence pattern of the data gathering routine of the second test agent, the data gathering routine of the second test agent;

outputting, by the processing circuitry, a graphical representation of the data indicating whether the event corresponding to the first inspected tree node is occurring or has occurred; and outputting, by the processing circuitry, a graphical representation of the data indicating whether the event corresponding to the second inspected tree node is occurring or has occurred.

2. The method of claim 1, further comprising:
outputting, by the processing circuitry, for display on the display device, a target configuration interface;
receiving, by the processing circuitry, via the target configuration interface, indications of user input to define the first target such that the first target comprises the first set of one or more system nodes in the distributed computing system; and
in response to receiving the indications of the user input to define the first target such that the first target comprises the first set of one or more system nodes in the distributed computing system, defining, by the processing circuitry, the first target such that the first target comprises the first set of one or more system nodes in the distributed computing system.

3. The method of claim 2, wherein receiving the indications of user input to define the first target such that the first target comprises the one or more system nodes in the distributed computing system comprises receiving, by the processing circuitry, the indications of user input to define the first target such that the first target comprises a plurality of system nodes in the distributed computing system and an indication of user input to define a name of the first target.

4. The method of claim 2, wherein receiving the indications of user input to define the first target such that the first target comprises the one or more system nodes in the distributed computing system comprises:
receiving, by the processing circuitry, indications of user input specifying identifiers of the first set of one or more system nodes in the distributed computing system.

5. The method of claim 1, wherein:
the method further comprises receiving, by the processing circuitry, an indication of user input to associate the first test agent with the first target; and
generating the data associating the first test agent with the first target comprises, in response to receiving the indication of user input to associate the first test agent with the first target, generating, by the processing circuitry, the data associating the first test agent with the first target.

6. The method of claim 1, wherein outputting the graphical representation of the data comprises:

outputting, by the processing circuitry, a multi-dimensional chart comprising a plurality of data points, each respective data point of the plurality of data points corresponding to a measurement gathered as part of a respective performance of the data gathering routine of the first test agent.

7. The method of claim 1, further comprising:
receiving, by the processing circuitry, an indication of user input to associate the first test agent with the first inspected tree node; and
in response to receiving the indication of user input to associate the first test agent with the first inspected tree node, generating, by the processing circuitry, the data associating the first test agent with the first inspected tree node.

8. The method of claim 1, wherein the event corresponding to the first inspected tree node corresponds to a cyber-attack on an individual system node or group of system nodes in distributed computing system.

9. The method of claim 1, wherein generating the data representing the risk model comprises:
receiving, by the processing circuitry, data identifying system nodes in the distributed computing system that perform the same roles in the distributed computing system; and
for each respective system node of the identified system nodes, automatically generating, by the processing circuitry, in the risk model, a respective sub-tree for the respective system node based on a predefined template sub-tree.

10. The method of claim 1, further comprising, determining, by the processing circuitry, based on the data gathered by the data gathering routine of the first test agent, one or more metrics, wherein the graphical representation includes the one or more metrics.

11. A system comprising:
a data storage system; and
processing circuitry configured to:
generate, in the data storage system, data representing a risk model for a distributed computing system, wherein:
the risk model comprises a plurality of tree nodes organized as a tree,
for each respective tree node of the risk model, the respective tree node corresponds to a respective event that may befall the distributed computing system,
for each respective non-leaf tree node of the risk model, the events corresponding to child tree nodes of the respective non-leaf tree node are preconditions of the event corresponding to the respective non-leaf tree node, and
the tree nodes of the risk model include a first inspected tree node and a second inspected tree node,
generate, in the data storage system, data associating a first test agent with a first target, the first test agent configured to perform a data gathering routine that gathers data from the first target associated with the first test agent, the first target associated with the first test agent comprising a first set of one or more system nodes in the distributed computing system;
generate, in the data storage system, data associating the first inspected tree node of the risk model with the first test agent, the data gathered by the data gathering routine of the first test agent comprising data indicating whether the event corresponding to the first inspected tree node is occurring or has occurred;

generate, in the data storage system, data associating a second test agent with a second target, the second test agent being different from the first test agent, the second test agent configured to perform a data gathering routine that gathers data from the second target associated with the second test agent, the second target associated with the second test agent comprising a second set of one or more system nodes in the distributed computing system;

generate, in the data storage system, data associating the second inspected tree node of the risk model with the second test agent, the data gathered by the data gathering routine of the second test agent comprising data indicating whether the event corresponding to the inspected tree node is occurring or has occurred;

perform, according to a predefined schedule that specifies a recurrence pattern of the data gathering routine of the first test agent, the data gathering routine of the first test agent;

perform, according to a second predefined schedule that specifies a recurrence pattern of the data gathering routine of the second test agent, the data gathering routine of the second test agent;

output a graphical representation of the data indicating whether the event corresponding to the inspected tree node is occurring or has occurred; and output a graphical representation of the data indicating whether the event corresponding to the second inspected tree node is occurring or has occurred.

12. The system of claim 11, wherein the processing circuitry is configured to:

output, for display on the display device, a target configuration interface;

receive, via the target configuration interface, indications of user input to define the first target such that the first target comprises the first set of one or more system nodes in the distributed computing system; and in response to receiving the indications of the user input to define the first target such that the first target comprises the first set of one or more system nodes in the distributed computing system, define the first target such that the first target comprises the first set of one or more system nodes in the distributed computing system.

13. The system of claim 12, wherein the processing circuitry is configured to receive the indications of user input to define the first target such that the first target comprises a plurality of system nodes in the distributed computing system and an indication of user input to define a name of the first target.

14. The system of claim 12, wherein the processing circuitry is configured such that, as part of receiving the indications of user input to define the first target such that the first target comprises the first set of one or more system nodes in the distributed computing system, the processing circuitry:

receives indications of user input specifying identifiers of the first set of one or more system nodes in the distributed computing system.

15. The system of claim 11, wherein:

the processing circuitry is further configured to receive an indication of user input to associate the first test agent with the first target; and the processing circuitry is configured such that, as part of generating the data associating the first test agent with the first target, the processing circuitry, in response to receiving the indication of user input to associate the first test agent with the first target, generates the data associating the first test agent with the first target.

16. The system of claim 11, wherein the processing circuitry is configured such that, as part of outputting the graphical representation of the data, the processing circuitry:

outputs a multi-dimensional chart comprising a plurality of data points, each respective data point of the plurality of data points corresponding to a measurement gathered as part of a respective performance of the data gathering routine of the first test agent.

17. The system of claim 11, wherein the processing circuitry is configured to:

receive an indication of user input to associate the first test agent with the first inspected tree node; and in response to receiving the indication of user input to associate the first test agent with the first inspected tree node, generate the data associating the first test agent with the first inspected tree node.

18. The system of claim 10, wherein the processing circuitry is configured such that, as part of generating the data representing the risk model, the processing circuitry:

receives data identifying system nodes in the distributed computing system that perform the same roles in the distributed computing system; and for each respective system node of the identified system nodes, automatically generates, in the risk model, a respective sub-tree for the respective system node based on a predefined template sub-tree.

19. A non-transitory computer-readable storage medium having instructions stored thereon that, when executed, configure an analysis computing system to:

generate data representing a risk model for a distributed computing system, wherein:

the risk model comprises a plurality of tree nodes organized as a tree, for each respective tree node of the risk model, the respective tree node corresponds to a respective event that may befall the distributed computing system, for each respective non-leaf tree node of the risk model, the events corresponding to child tree nodes of the respective non-leaf tree node are preconditions of the event corresponding to the respective non-leaf tree node, the tree nodes of the risk model include a first inspected tree node and a second inspected tree node, generate data associating a first test agent with a first target, the first test agent configured to perform a data gathering routine that gathers data from the first target associated with the first test agent, the first target associated with the first test agent comprising a first set of one or more system nodes in the distributed computing system;

generate data associating the first inspected tree node of the risk model with the first test agent, the data gathered by the data gathering routine of the first test agent comprising data indicating whether the event corresponding to the first inspected tree node is occurring or has occurred;

generate data associating a second test agent with a second target, the second test agent being different from the first test agent, the second test agent configured to perform a data gathering routine that gathers data from the second target associated with the second test agent, the second target associated with the second test agent comprising a second set of one or more system nodes in the distributed computing system;

generate data associating the second inspected tree node of the risk model with the second test agent, the data gathered by the data gathering routine of the second test agent comprising data indicating whether the event corresponding to the inspected tree node is occurring or has occurred;

perform, according to a first predefined schedule that specifies a recurrence pattern of the data gathering routine of the first test agent, the data gathering routine of the first test agent;

perform according to a second predefined schedule that specifies a recurrence pattern of the data gathering routine of the second test agent, the data gathering routine of the second test agent;

output a graphical representation of the data indicating whether the event corresponding to the first inspected tree node is occurring or has occurred; and output, by the processing circuitry, a graphical representation of the data indicating whether the event corresponding to the second inspected tree node is occurring or has occurred.

* * * * *